(12) United States Patent
Fujita et al.

(10) Patent No.: US 8,187,756 B2
(45) Date of Patent: May 29, 2012

(54) FUEL CELL SYSTEM

(75) Inventors: Nobuo Fujita, Toyota (JP); Hiroyuki Yumiya, Toyota (JP); Taisuke Miyamoto, Okazaki (JP); Hiroyuki Sekine, Nagoya (JP); Mituhiro Satou, Toyota (JP); Sadatoshi Takahashi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1043 days.

(21) Appl. No.: 11/661,386
(22) PCT Filed: Sep. 6, 2005
(86) PCT No.: PCT/JP2005/016689
§ 371 (c)(1),
(2), (4) Date: Feb. 28, 2007
(87) PCT Pub. No.: WO2006/028237
PCT Pub. Date: Mar. 16, 2006

(65) Prior Publication Data
US 2007/0264554 A1 Nov. 15, 2007

(30) Foreign Application Priority Data

Sep. 6, 2004 (JP) ................................. 2004-258643
Sep. 6, 2004 (JP) ................................. 2004-258661
Dec. 20, 2004 (JP) ................................. 2004-367962

(51) Int. Cl.
*H01M 8/06* (2006.01)
(52) U.S. Cl. ......... 429/410; 429/413; 429/414; 429/408
(58) Field of Classification Search ................. 210/263, 210/295, 150, 151, 418; 55/421, 410, 418, 55/467, 424, 425, 431, 459.1; 429/408, 410; 422/168, 176, 177, 180, 211, 608; 96/234, 96/236, 240, 314; 261/5, 19, 74, 79.1
See application file for complete search history.

(56) References Cited

U.S. PATENT DOCUMENTS

| | | | |
|---|---|---|---|
| 5,298,226 A * | 3/1994 | Nowobilski | 422/171 |
| 2002/0094469 A1 | 7/2002 | Yoshizumi et al. | |
| 2005/0115884 A1 * | 6/2005 | Suzuki et al. | 210/282 |
| 2008/0070090 A1 | 3/2008 | Yoshizumi et al. | |
| 2010/0151360 A1 | 6/2010 | Yoshizumi et al. | |

FOREIGN PATENT DOCUMENTS

JP U-06-29002 4/1994

(Continued)

OTHER PUBLICATIONS

U.S. Appl. No. 10/588,604, filed Aug. 7, 2006 in the name of Taisuke Miyamoto et al.

*Primary Examiner* — Jennifer Michener
*Assistant Examiner* — Heng Chan
(74) *Attorney, Agent, or Firm* — Oliff & Berridge, PLC

(57) ABSTRACT

An ion exchange resin member 20 that serves as an impurity remover for removing impurities from fluid F discharged from a fuel cell 100 is placed in a discharge passage for the fluid F to flow through, and a dispersion means for dispersing the fluid F over, and making the fluid F flow to, an entry-side surface 21 of the ion exchange resin member 20 is placed upstream from the ion exchange resin member 20. Also, a gas discharge part and a liquid discharge part are placed downstream from a fluid outlet of the ion exchange resin member 20, and a liquid-movement-preventing means for preventing a liquid in the fluid discharged from the fluid outlet from moving toward the gas discharge part is placed between the ion exchange resin member 20 and at least either the gas discharge part or the liquid discharge part.

8 Claims, 36 Drawing Sheets

FOREIGN PATENT DOCUMENTS

| | | |
|---|---|---|
| JP | A-08-298130 | 11/1996 |
| JP | A 9-312166 | 12/1997 |
| JP | A-2001-116310 | 4/2001 |
| JP | A-2002-289237 | 4/2002 |
| JP | 2002-313404 | * 10/2002 |
| JP | A 2002-313404 | 10/2002 |
| JP | A 2002-324561 | 11/2002 |
| JP | 2002-373700 | * 12/2002 |
| JP | 2002373698 A | * 12/2002 |
| JP | A 2002-373698 | 12/2002 |
| JP | A 2002-373700 | 12/2002 |
| JP | A-2003-142131 | 5/2003 |
| JP | A-2003-214675 | 7/2003 |
| JP | 2003249249 A | * 9/2003 |

* cited by examiner

FUEL CELL SYSTEM

TECHNICAL

The present invention relates to a fuel cell system. In particular, this invention relates to a fuel cell system equipped with an impurity remover that removes impurities from a fluid discharged from a fuel cell and is located in a discharge passage for the fluid to flow through.

BACKGROUND ART

In conventional fuel cell systems including fuel cells, not all supplied hydrogen is used for the cell reaction. Accordingly, the fuel cell system adopts a circulation system for effectively using the discharged and unreacted hydrogen by sending it back to the fuel cell again; a gas-liquid separator is placed in the circulation system, and it removes moisture from a gas-liquid mixture fluid in which exhaust gas discharged from the fuel cell and water generated by the cell reaction in the fuel cell are mixed together.

Minute amounts of impurities dissolving from, for example, piping parts of the fuel cell or the system exist in the gas and water flowing through the hydrogen circulation system. Also, impurities in the air drawn in from outside on the cathode side may enter a passage to the system, pass through an electrolyte membrane, and be mixed in the hydrogen circulation system. In particular, if metal ions exist in the impurities dissolving from, for example, piping parts of the fuel cell or the system, there is the possibility of the functions of the fuel cell itself being degraded or the service life of the fuel cell being shortened. In addition, the water generated in the fuel cell may become acidic. Accordingly, a method for inhibiting deterioration of the fuel cell due to, for example, the generated water and gas by placing an ion exchanger in the hydrogen circulation system has been adopted.

Recently, a solid polymer fuel cell system with an ion removal unit has been introduced, and the ion removal unit removes ions contained in water generated by the fuel cell and accompanied by an exhaust gas, and is placed on the side closer to a solid polymer fuel cell of at least one exhaust pipe from which the water generated by the fuel cell is discharged. It is disclosed that in this solid polymer fuel cell system, fluoride ions are removed using an ion exchange resin as a means for removing ions from the water. (See, for example, Patent Document 1).

Also, there is a fuel cell generator in which an impurity removal member is located in an exhaust manifold on the air side. (See, for example, Patent Document 2).

[Patent Document 1] JP2002-313404 A
[Patent Document 2] JP9-312166 A

DISCLOSURE OF THE INVENTION

A liquid (liquid droplets) in a fluid (gas-liquid mixture) passing through an impurity remover may, because of its weight, continuously flow to a specified area of an entry-side surface (inlet surface) of the impurity remover. This phenomenon occurs in the solid polymer fuel cell system described in Patent Document 1 and in the fuel cell generator described in Patent Document 2. In these prior art examples, the generated water (liquid droplets) in particular, from among the gas and the generated water discharged from the fuel cell, may disproportionately flow to a specified area of the inlet surface of the ion exchange resin. Accordingly, there is a possibility that the ion exchange resin may deteriorate locally.

After the fluid has passed through the ion exchange resin (the impurity removal member), the liquid moves toward a liquid discharge part and the gas moves toward a gas discharge part. When this happens, it is necessary to prevent the liquid from being caught by the gas and taken into the gas discharge part and enhance gas-liquid separability in order to allow only the gas to be supplied to the gas discharge part.

However, the solid polymer fuel cell system described in Patent Document 1 is designed to remove impurities from the liquid by first separating the fluid into gas and liquid and then having the separated liquid pass through the ion exchange resin. This means that the liquid in the fluid (gas-liquid mixture) does not pass through the ion exchange resin and, therefore, it is unnecessary to consider the possibility of the liquid that has passed through the ion exchange resin being caught by the gas and taken into the gas discharge part. Accordingly, as a matter of course, Patent Document 1 does not disclose any configuration that prevents the liquid that has passed through the ion exchange resin from being caught by the gas and taken into the gas discharge part.

The fuel cell generator described in Patent Document 2 also does not describe any configuration that prevents the liquid that has passed through the impurity removal member (ion exchange resin) from being caught by the gas and taken into the gas discharge part, or that enhances gas-liquid separability.

It is an object of the invention to improve on the conventional fuel cell systems and provide a fuel cell system that can prevent the generated water from disproportionately flowing to a specified area of an entry-side (inlet) surface of an impurity remover, and use the entire impurity remover efficiently.

It is another object of the invention to provide a fuel cell system that can prevent the liquid from being caught by the gas and taken into the gas discharge part when a gas-liquid mixture fluid has passed through the impurity remover and then the liquid moves towards the liquid discharge part and the gas moves toward the gas discharge part, and that can enhance gas-liquid separability.

In order to achieve these objects, the invention provides a fuel cell system equipped with an impurity remover that removes impurities from a fluid discharged from a fuel cell, that is located in a discharge passage for the fluid to flow through, wherein a dispersion means for dispersing the fluid over, and making the fluid flow to, an entry-side surface of the impurity remover is placed upstream from the impurity remover.

Since the fuel cell system having the above-described configuration can disperse the fluid over, and make the fluid flow to, the entry-side surface of the impurity remover, it is possible to prevent the fluid from disproportionately flowing to a specified area of the entry-side surface of the impurity remover. As a result, the entire impurity remover can be used efficiently.

To disperse the fluid over, and make the fluid flow to, the entry-side surface of the impurity remover means that the fluid (gas-liquid mixture) flowing to the entry-side surface of the impurity remover is prevented from continuously and disproportionately flowing to a specified area of the entry-side surface of the impurity remover, and that the fluid is ideally made to evenly flow to the entry-side surface of the impurity remover.

The impurity remover can be located at a position in the discharge passage where gas and liquid coexist.

Also, the dispersion means according to the invention can be configured to disperse a flow of the fluid upstream from the impurity remover. More specifically, the dispersion means may be placed on the entry-side surface of the impurity remover or upstream from and a distance away from the entry-side surface of the impurity remover.

The dispersion means placed on the entry-side surface of the impurity remover can disperse the fluid flow over the entry-side surface of the impurity remover. The dispersion means having the above-described configuration can guide the fluid flow so that the fluid, in particular the liquid will be dispersed over the entire entry-side surface of the impurity remover.

Moreover, the dispersion means that disperses the fluid flow over the entry-side surface of the impurity remover can include a fluid passage formed around the outer periphery of the entry-side surface of the impurity remover. This fluid passage may be composed of a groove member formed in the entry-side surface of the impurity remover.

Furthermore, the dispersion means may include an inclined plane that is inclined downward from its outer periphery toward its central part. This configuration allows the liquid, because of its weight, run over the inclined plane. Therefore, drainage ability can be further improved.

The dispersion means can include a rotor blade that can rotate and radiates out from its rotation axis. The dispersion means having this configuration can evenly splash the fluid (the liquid in particular) by rotating the rotor blade and thereby evenly disperse the fluid over, and make the fluid flow to, the entry-side surface of the impurity remover. This dispersion means may include a plurality of rotor blades that radiate out from the rotation axis.

The rotor blade may be placed in contact with the entry-side surface of the impurity remover or a distance away from the entry-side surface of the impurity remover. In particular, if the rotor blade is placed in contact with the entry-side surface of the impurity remover, this configuration has an advantage in that the fluid (particularly the liquid) falling on the entry-side surface of the impurity remover can be collected by the rotor blade and dispersed more evenly over the entry-side surface of the impurity remover.

Moreover, according to the invention, a porous member whose pores constitute a plurality of through-holes may be placed downstream from the rotor blade or rotor blades. This configuration allows the fluid, in particular the liquid to be received in a space (or room) formed by the rotor blade(s) and the porous member. Accordingly, after the liquid is retained in this space once, the liquid can be discharged through the through-holes in the porous member. As a result, the liquid can be dispersed over, and made to flow to, the entry-side surface of the impurity remover more evenly.

Furthermore, the rotor blade or rotor blades may be configured so that it or they can be made to rotate by the flow of the fluid or by other drive sources.

The dispersion means according to the invention may be a fluid introducing member in which a plurality of through-holes is formed. In this case, the through-holes may radiate out from the central part of the dispersion means toward its outer periphery. Also, the through-holes may bee placed in a staggered manner. Because the through-holes are arranged in the dispersion means as described above, the fluid, in particular the liquid can be dispersed over and made to flow to the impurity remover more efficiently and evenly.

The through-holes may be formed so that they have different aperture sizes depending on their distance from the central part of the dispersion means. Also, the through-holes may be formed so that the aperture size of each through-hole increases the closer it is located to the outer periphery of the dispersion means. By forming the through-holes as described above, the inflow amount of the fluid, in particular the liquid flowing to the impurity remover can be better equalized.

The dispersion means can be configured so that it supplies the fluid from directions different from the direction in which the fluid normally flows to the entry-side surface of the impurity remover. Because of this configuration, the fluid flow becomes turbulent, such as in a swirling flow at a position upstream from the entry-side surface of the impurity remover, and then flows to the entry-side surface of the impurity remover. Consequently, it is possible to prevent disproportionate inflow of the fluid into the impurity remover.

Moreover, the fuel cell system can be configured so that the fluid to be supplied from the discharge passage to the impurity remover is supplied from directions different from the direction in which the fluid normally flows to the impurity remover. The directions different from the direction in which the fluid normally flows to the impurity remover are directions not parallel (nonparallel direction) with the direction in which the fluid normally flows to the impurity remover; various directions can be examples of those different directions, including directions perpendicular, tangential, or inclined to the direction in which the fluid normally flows to the impurity remover, or directions not perpendicular to the entry-side surface of the impurity remover, or if the impurity remover is placed in a generally columnar case, directions nonparallel to the central axis of the case. When the fluid, which has become turbulent, such as in a swirling flow (cyclone) at a position upstream from the impurity remover, flows to the impurity remover (i.e., when the fluid flows to the impurity remover from directions different from the direction in which the fluid normally flows to the impurity remover, it is possible to prevent disproportionate inflow of the fluid into the impurity remover.

Furthermore, the dispersion means can be configured so that it has a fluid passage connected to the discharge passage to allow the fluid to flow therebetween, and the fluid passage has a larger aperture size than that of the discharge passage. This configuration makes it possible to prevent disproportionate inflow of the fluid into the impurity remover.

The dispersion means may be composed of a direction changer for changing the fluid supply direction in which the fluid is supplied from the discharge passage to the impurity remover, to directions different from the direction in which the fluid normally flows to the impurity remover. Accordingly, it is possible to prevent disproportionate inflow of the fluid into the impurity remover by changing the direction of the fluid arbitrarily.

Also, the dispersion means may be composed of a supply-status-changing means for changing the supply status of the fluid to be supplied to the impurity remover according to the operation status of the fuel cell. Because of this configuration, the flow of the fluid into the impurity remover can be changed according to the status of the fluid discharged from the fuel cell. Therefore, it is possible to prevent disproportionate inflow of the fluid into the impurity remover.

The impurity remover may be placed inside or outside the gas-liquid separator. Also, the impurity remover can be placed in a piping system where the gas-liquid separator is not provided.

Furthermore, the dispersion means can be composed of a plurality of discharge passages located upstream from the impurity remover. Since this configuration allows the fluid to flow from the plurality of discharge passages to the entry-side surface of the impurity remover, the fluid can be dispersed over, and made to flow to, the entry-side surface of the impurity remover. As a result, it is possible to prevent the fluid from disproportionately flowing to a specified area of the entry-side surface of the impurity remover and use the entire impurity remover efficiently.

The discharge passages can be connected to a case (housing) for housing the impurity remover.

Moreover, the fuel cell system may be configured so that the impurity remover is placed inside the gas-liquid separator and the discharge passages are connected to the gas-liquid separator.

Furthermore, in the fuel cell system described above according to the invention, a gas discharge part and a liquid discharge part may be provided downstream from a fluid outlet of the impurity remover, and a liquid-movement-preventing means for preventing a liquid in the fluid discharged from the fluid outlet from moving toward the gas discharge part may be placed between the impurity remover and at least either the gas discharge part or the liquid discharge part. When the fluid has passed the impurity remover and then the liquid moves toward the liquid discharge part and the gas moves toward the gas discharge part, the above-described configuration makes it possible, in addition to the aforementioned advantageous effects, to prevent the liquid from moving toward the gas discharge part (for example, being caught by the gas and taken into the gas discharge part). As a result, gas-liquid separability can be enhanced.

Furthermore, the present invention provides a fuel cell system equipped with an impurity remover that removes impurities from a fluid discharged from a fuel cell, that is located in a discharge passage for the fluid to flow through, wherein a gas discharge part and a liquid discharge part are provided downstream from a fluid outlet of the impurity remover, and a liquid-movement-preventing means for preventing a liquid in the fluid discharged from the fluid outlet from moving toward the gas discharge part is placed between the impurity remover and at least one of the gas discharge part and the liquid discharge part.

In the fuel cell system having the above-described configuration, the liquid-movement-preventing means for preventing a liquid in the fluid discharged from the fluid outlet from moving toward the gas discharge part is placed between the impurity remover and at least one of the gas discharge part and the liquid discharge part. Accordingly, when the fluid has passed through the impurity remover and then the liquid moves toward the liquid discharge part and the gas moves toward the gas discharge part, the above-described configuration makes it possible to prevent the liquid from moving toward the gas discharge part (for example, being caught by the gas and taken into the gas discharge part). As a result, gas-liquid separability can be enhanced.

The above configuration also functions as a gas-movement-preventing means for preventing the gas from moving with the liquid toward the liquid discharge part when the fluid has passed through the impurity remover and then the liquid moves toward the liquid discharge part and the gas moves toward the gas discharge part.

The liquid-movement-preventing means may include a liquid-mass-increasing means, located at the fluid outlet of the impurity remover, for increasing the mass of the liquid. Since this configuration increases the mass of the liquid, it is possible to increase the kinetic (gravitational) energy of the liquid relative to the gas and separate the gas-liquid mixture efficiently. Also, gravity makes it easier for the liquid to move toward the liquid discharge part. Furthermore, since the size of the liquid droplets can be increased, it is possible to more reliably prevent the liquid from moving toward the gas discharge part.

Moreover, the fuel cell system according to the invention may be configured so that the fluid outlet of the impurity remover is composed of a porous member whose pores constitute a plurality of through-holes, and the liquid-mass-increasing means is composed of a plurality of holes. This configuration makes it possible to collect the liquid in the respective through-holes and increase the size of the liquid droplets.

Furthermore, the fuel cell system according to the invention can be configured so that the liquid-mass-increasing means includes a liquid concentration means for concentrating the liquid into a specified area of the fluid outlet. This configuration can also increase the mass of the liquid by concentrating the liquid.

The liquid concentration means may include an inclined plane for guiding the liquid to move toward the specified area. The inclined plane can be inclined in the direction of gravitational force and away from the gas discharge part.

Furthermore, the fuel cell system according to the invention can be configured so that the fluid outlet of the impurity remover is composed of a porous member whose pores constitute a plurality of through-holes, and the porous member forms the inclined plane. In this configuration, gravity causes the liquid to be concentrated over the inclined plane and the size of the liquid droplets can be increased by collecting the concentrated liquid in the respective through-holes. As a result, it is possible to more reliably prevent the liquid from moving toward the gas discharge part and make the liquid move toward the liquid discharge part more easily.

Furthermore, the fluid outlet of the impurity remover can be composed of a porous member in which a plurality of through-holes is formed; and if the inclined plane is formed at the fluid outlet, the through-holes can be formed so that their aperture sizes increase with their distance away from the gas discharge part. This configuration allows the area where the liquid is concentrated to be located away from the gas discharge part and also allows the gas discharge part to be located above the liquid-concentration area. Therefore, it is possible to more reliably prevent the liquid from moving toward the gas discharge part.

In the fuel cell system according to the invention, the fluid inlet of the impurity remover can be composed of a porous member whose pores constitute a plurality of through-holes, and the aperture size of each through-hole at the fluid inlet can be decided according to the length of the impurity remover in the direction of fluid flow determined by the inclination angle of the inclined plane. When this configuration is employed, even if the length of the impurity remover from its fluid inlet to its fluid outlet (distance over which the liquid passes) varies in different areas of the impurity remover, the liquid can be discharged more easily in the area with the longer liquid-flow-direction length of the impurity remover. As a result, the liquid discharge processing can be performed more smoothly.

Moreover, the through-holes at the fluid inlet can be formed so that their aperture sizes increase as the length of the impurity remover in the direction of fluid flow becomes longer. If this configuration is employed, a comparatively large amount of the fluid flows to the area with a long length of the impurity remover from the fluid inlet to the fluid outlet and a comparatively small amount of the fluid flows to the area with a short length of the impurity remover from the fluid inlet to the fluid outlet. Therefore, even if the length of the impurity remover from the fluid inlet to the fluid outlet varies in different areas of the impurity remover, the flow rate of the liquid in relation to the liquid-flow-direction length can be kept constant and the impurity remover can be used more efficiently.

Furthermore, the liquid-movement-preventing means of the fuel cell system according to the invention can include a fluid-flow-speed-decreasing means for decreasing the flow rate of the fluid, located at an inlet of the gas discharge part.

Since this configuration slows down the speed of the fluid, it is possible to prevent heavy-mass liquid from being caught by the gas and moving toward the gas discharge part.

This fluid-flow-speed-decreasing means can be configured so that the aperture size of the inlet of the gas discharge part is larger than that of the downstream side of the gas discharge part.

Furthermore, the liquid-movement-preventing means in the fuel cell system according to the invention can include a fluid deflecting means for deflecting the flow of the fluid, located between the fluid outlet of the impurity remover and the inlet of the gas discharge part. Since this configuration can deflect the movement direction of heavy-mass liquid in an arbitrary direction (a direction away from the gas discharge part), it is possible to more reliably prevent the liquid from moving toward the gas discharge part.

This fluid deflecting means may be configured so that it guides the liquid in the fluid toward a specified direction, and may be placed at the inlet of the gas discharge part.

The liquid-movement-preventing means of the fuel cell system according to the invention may include a liquid guide means for guiding the liquid in the fluid from the fluid outlet of the impurity remover to the liquid discharge part. This configuration makes it possible to more reliably prevent the liquid from moving toward the gas discharge part.

This liquid guide means can be configured so that it guides the liquid in a direction away from the gas discharge part.

Moreover, the liquid-movement preventing means in the fuel cell system according to the invention can include a liquid collecting member for allowing a gas in the fluid to pass through and collecting the liquid, located in the gas discharge part. Even if the liquid moves toward the gas discharge part, the above-described configuration makes it possible to have the liquid collecting member collect the liquid and have the liquid discharge part discharge the liquid.

Furthermore, the impurity remover in the fuel cell system according to the invention can include an impurity removal member, a case for housing the impurity removal member, and a gas discharge passage that is defined by the case and constitutes part of the gas discharge part; and wherein a fluid inlet for allowing the fluid to flow to the impurity removal member can be formed on an upstream-side surface of the case and a fluid outlet for discharging the fluid that has passed through the impurity removal member can be formed on a downstream-side surface of the case.

Also, the impurity remover may be placed inside the gas-liquid separator. This gas-liquid separator may be configured to separate a gas from a liquid by generating a swirling flow.

BEST MODE FOR IMPLEMENTING THE INVENTION

Fuel cell systems according to preferred embodiments of this invention will be described below in detail with reference to the attached drawings. The embodiments described below are for the purpose of describing this invention, but the invention is not limited only to these embodiments. Accordingly, this invention can be utilized in various ways unless the utilizations depart from the gist of the invention.

(First Embodiment)

Figure 1:
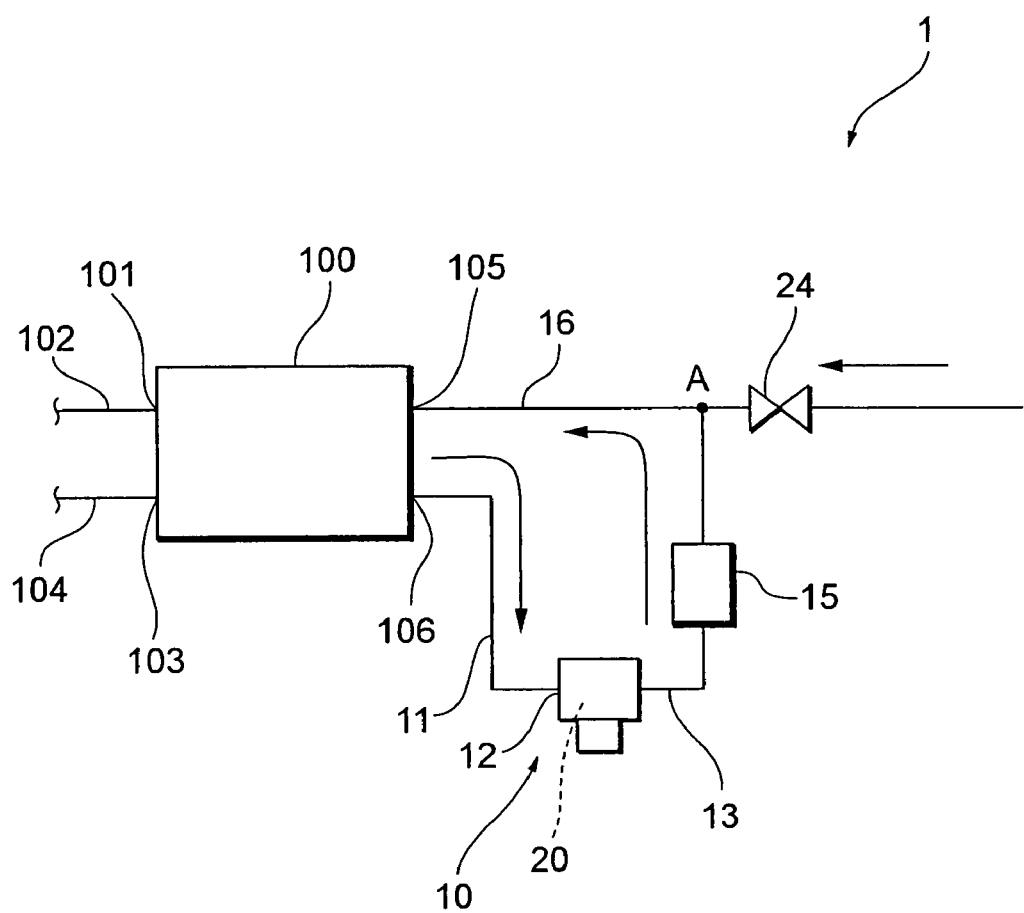
FIG. 1 is a schematic configuration diagram of a fuel cell system according to the first embodiment of the present invention.
Figure 2:
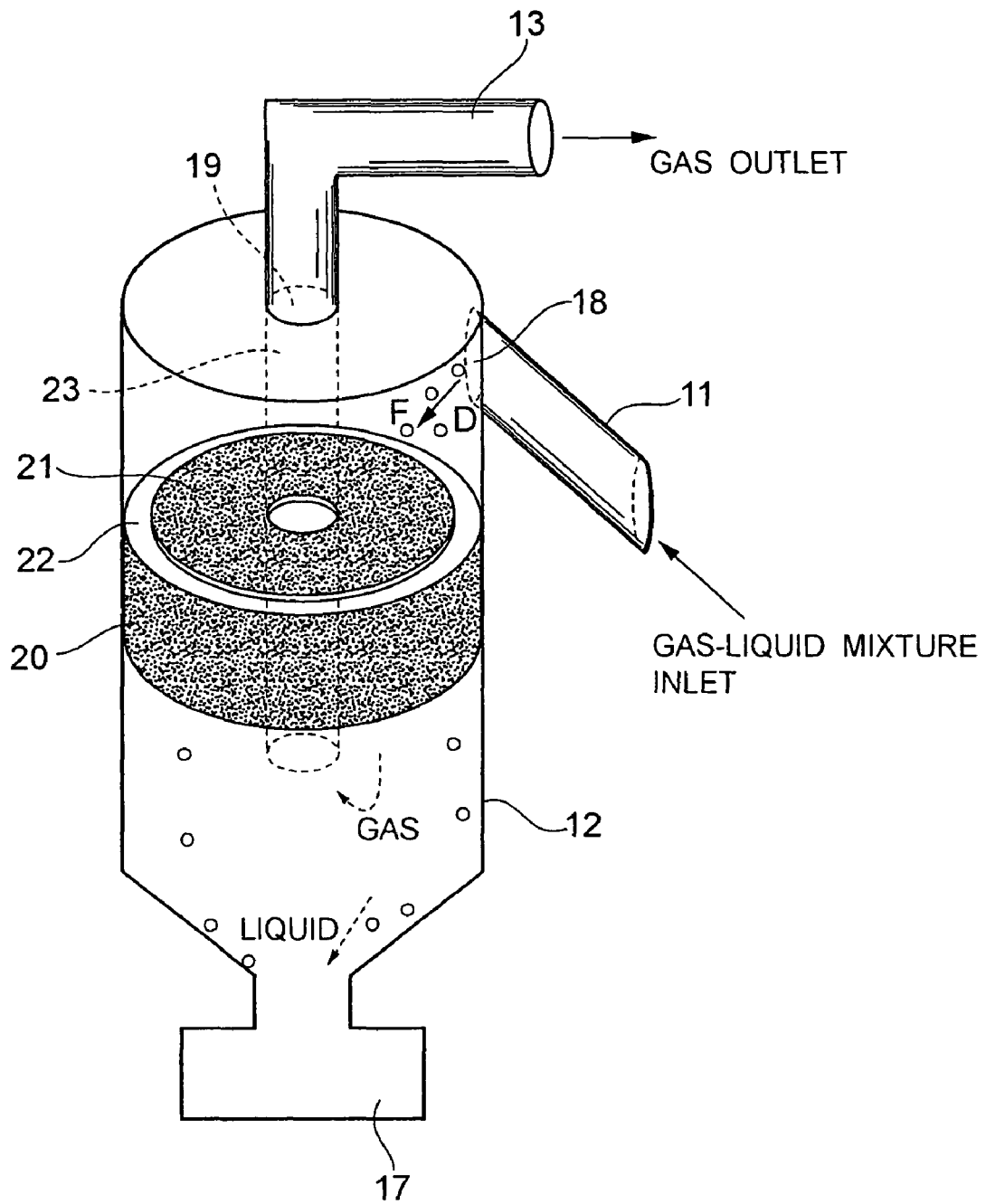
FIG. 2 is a perspective view of a gas-liquid separator, an ion exchange resin member, and their surrounding area in the fuel cell system shown in FIG. 1, and shows the interior of the gas-liquid separator.
Figure 3:
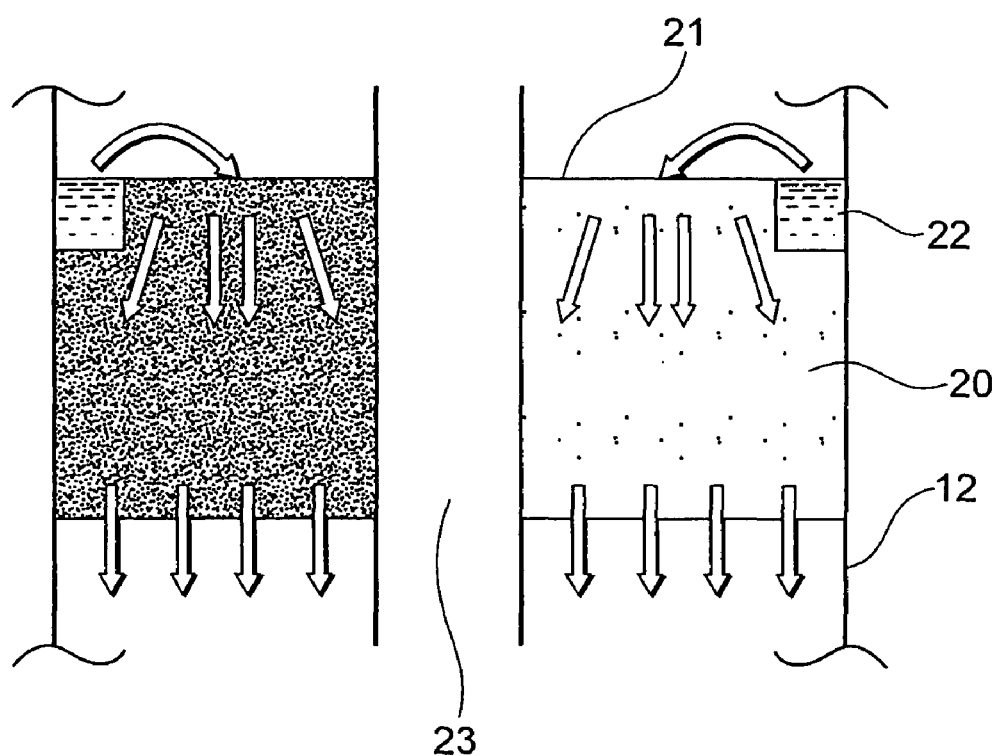
FIG. 3 is an enlarged cross-sectional view of the ion exchange resin member shown in FIG. 2.

FIG. 1 is a schematic configuration diagram of a fuel cell system according to the first embodiment. FIG. 2 is a perspective view of a gas-liquid separator, an ion exchange resin member, and their surrounding area in the fuel cell system shown in FIG. 1, and shows the interior of the gas-liquid separator. FIG. 3 is an enlarged cross-sectional view of the ion exchange resin member shown in FIG. 2.

In the first embodiment, a circulation passage provided in a hydrogen circulation system will be described as an example of a discharge passage to allow a fluid from a fuel cell to flow through.

As shown in FIG. 1, a fuel cell 100 of a fuel cell system 1 according to the first embodiment is configured in such a way that it contains a stack made of a plurality of cells. Each cell is constructed by laying an MEA and a separator, one over the other; wherein the separator forms a passage for supplying a fuel gas (hydrogen) to a fuel electrode (or anode), and an oxidizing gas (oxygen [usually the air]) to an oxidizer electrode (or cathode).

An air supply port 101 of this fuel cell 100 is connected to an air supply passage 102 for supplying air as an oxidizing gas, while an air exhaust port 103 is connected to an air exhaust passage 104 for exhausting the air and water discharged from the fuel cell 100. A hydrogen supply port 105 of the fuel cell 100 is connected to one end of a hydrogen circulation system 10, while a hydrogen exhaust port 106 is connected to the other end of the hydrogen circulation system 10.

Receiving un-reacted hydrogen and the generated water discharged from the fuel cell 100, the hydrogen circulation system 10 circulates the un-reacted hydrogen and resupplies it together with new hydrogen to the fuel cell 100, and discharges the generated water. This hydrogen circulation system 10 includes: a circulation passage 11 whose one end is connected to the hydrogen exhaust port 106; a gas-liquid separator 12 that is connected to the other end of the circulation passage 11 and separates the hydrogen from water introduced from the circulation passage 11; an ion exchange resin member 20 that serves as an impurity remover placed inside the gas-liquid separator 12; a circulation passage 13 to which the gas discharged from the gas-liquid separator 12 is introduced; a circulating pump 15 that is connected to a position downstream from the circulation passage 13 and works as a circulating power source for the hydrogen circulation system 10; and a hydrogen supply passage 16 whose one end is connected to the hydrogen supply port 105 to supply hydrogen to the fuel cell 100, and whose the other end is connected to the downstream end of the circulation passage 13 at junction A. Reference numeral 24 indicates a valve for adjusting hydrogen pressure when supplying hydrogen to the fuel cell 100.

As shown in FIG. 2 in particular, the gas-liquid separator 12 has a hollow body formed in a generally cylindrical shape; and a gas-liquid inlet 18 for introducing the hydrogen and water discharged from the circulation passage 11, and a gas outlet 19 for discharging the gas separated in the gas-liquid separator 12. This gas-liquid separator 12 separates fluid F (gas-liquid mixture) introduced through the gas-liquid inlet 18 into gas and liquid by swirling the gas-liquid mixture.

A water exhaust port 17 for receiving and discharging the water separated by the gas-liquid separator 12 is formed at a lower part of the gas-liquid separator 12. This water exhaust port 17 is equipped with a drain valve (not shown) configured to discharge only the water separated by the gas-liquid separator 12, without discharging hydrogen.

This ion exchange resin member 20 contains a cation exchange resin and an anion exchange resin, and is placed in contact with the inside wall of the gas-liquid separator 12. Consequently, the gas introduced through the gas-liquid inlet 18 and separated from liquid in the gas-liquid mixture passes through the ion exchange resin member 20, and is then discharged through the gas outlet 19 to the circulation passage 13. The ion exchange resin, a component of the ion exchange resin member 20, is usually in particulate form, but resin in a fibrous form can also be used.

A fluid passage 22 that serves as a dispersion means for dispersing the fluid F over, and making it flow to, an entry-side surface 21 of the ion exchange resin member 20 is formed around the outer periphery of the entry-side surface 21 of the ion exchange resin member 20 into which the fluid F flows. As shown in FIG. 3 in particular, this fluid passage 22 is composed of a depressed groove (gutter) defined by the inside wall of the gas-liquid separator 12 and a recess formed around the outer periphery of the entry-side surface 21 of the ion exchange resin member 20. The fluid passage 22 is designed so that the liquid, such as the generated water received in this fluid passage 22, circulates around the fluid passage 22.

This fluid passage 22 may be formed in, for example, a resin case (not shown in the drawing) for protecting the ion exchange resin that is a component of the ion exchange resin member 20; and the fluid passage 22 may be defined by the case and the inside wall of the gas-liquid separator 12.

Also, a gas passage 23 that passes through the central part of the ion exchange resin member 20 is formed in the central part of the gas-liquid separator 12 (along the central axis of the cylindrical shape). This gas passage 23 is connected to the circulation passage 13 and allows the hydrogen separated from the fluid F by the gas-liquid separator 12 to pass through and flow to the circulation passage 13.

When hydrogen and air are supplied to the fuel cell 100 of the fuel cell system 1 having the configuration described above, they start the following electric reactions.

Reaction at the fuel electrode (anode)

Reaction at the oxidizer electrode (cathode)

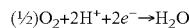

Reaction in the fuel cell in its entirety

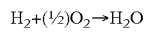

Because of these cell reactions, the un-reacted hydrogen as well as the generated water is discharged at the fuel electrode (anode) through the hydrogen exhaust port 106 to the circulation passage 11.

The generated water and the un-reacted hydrogen discharged to the circulation passage 11 are moved by the power of the circulating pump 15 to the gas-liquid separator 12, where the generated water and the un-reacted hydrogen are separated into gas (hydrogen) and liquid (water). When this happens, the fluid F (gas-liquid mixture) supplied from the circulation passage 11 becomes turbulent, such as in a swirling flow (cyclone), and then flows to the ion exchange resin member 20. Specifically speaking, the fluid F flows to the ion exchange resin member 20 from directions different from the direction in which the fluid normally flows to the ion exchange resin member 20 (the direction indicated with arrow D in FIG. 2). At this moment, most of the liquid, such as the generated water, in the fluid F dribbles down the inside wall of the gas-liquid separator 12 and is then received by the fluid passage 22. The liquid received by the fluid passage 22 then circulates around the periphery of the fluid passage 22, and the liquid that has spilled out of the fluid passage 22 flows to the ion exchange resin member 20. Accordingly, it is possible to disperse the liquid over, and make it flow to, the entire ion exchange resin member 20 and use the entire ion exchange resin member 20 efficiently.

In conventional cases, most of the liquid in the fluid F (gas-liquid mixture) dribbles down the inside wall of the circulation passage 11 (the inside wall of the pipe). Accordingly, when the liquid is supplied to the gas-liquid separator 12, the liquid, because of its weight, departs from the swirling flow and falls down due to the influence of gravity. The liquid fall location may vary depending on the flow speed of the swirling flow, but is almost always directly below the gas-liquid inlet 18 and its vicinity. Such a phenomenon occurs not only in a gas-liquid separator of the type that separates the gas-liquid mixture into gas and liquid by utilizing the swirling flow, but also generally in piping systems where a fluid flows.

Since the fluid passage 22 that is the dispersion means is formed in the first embodiment, even if the liquid falls down directly below the gas-liquid inlet 18 and its vicinity, the liquid will be received by the fluid passage 22 and, therefore, will be dispersed over, and made to flow to, the entire ion exchange resin member 20.

The liquid that has flown into the ion exchange resin member 20 dribbles down the inside wall of the gas-liquid separator 12 and is received by the water discharge port 17. On the other hand, hydrogen passes through the ion exchange resin member 20 and moves down to the lower part of the gas-liquid separator 12, and then moves via the gas passage 23 to the circulation passage 13. Also, impurities contained in the liquid are absorbed by the ion exchange resin member 20.

Moreover, since the ion exchange resin member 20 is placed inside the gas-liquid separator 12, that is, since the space originally existing in the gas-liquid separator 12 is used as a space for the ion exchange resin member 20, there is no need to increase the size of the fuel cell system 1 in order to install the ion exchange resin member 20. Also, only the very minimum components are required to install the ion exchange resin member 20 and, therefore, it is possible to curb any cost increases.

The first embodiment described the case where the fluid passage 22 formed around the outer periphery of the entry-side surface 21 of the ion exchange resin member 20 disperses the fluid F over, and makes it flow to, the entry-side surface 21 of the ion exchange resin member 20. However, the configuration of the dispersion means is not limited to this example, and the dispersion means for dispersing the fluid F over, and making it flow to, the entry-side surface 21 of the ion exchange resin member 20 may be located upstream from and a distance away from the entry-side surface 21 of the ion exchange resin member 20.

Figure 4:
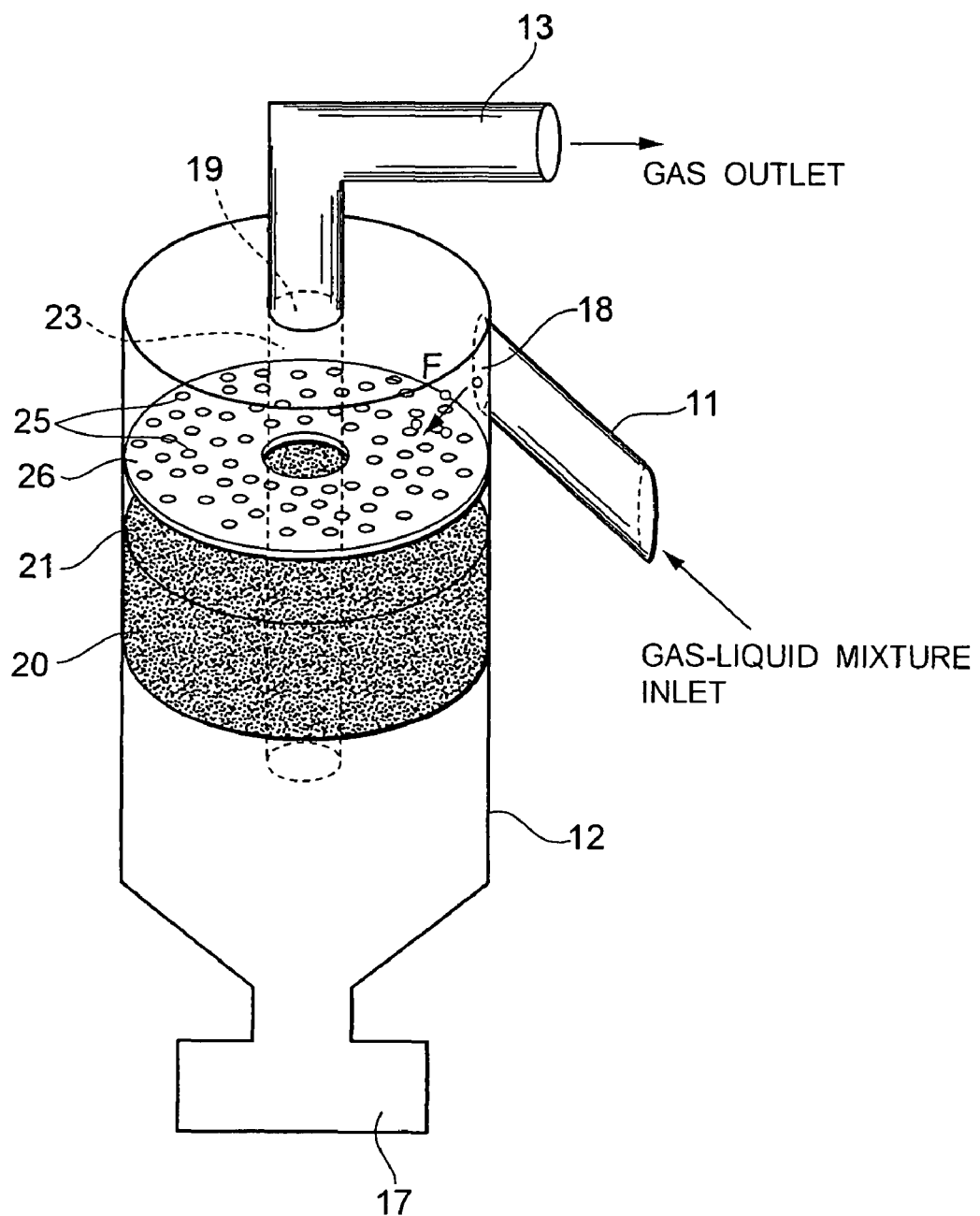
FIG. 4 is a perspective view of a gas-liquid separator, an ion exchange resin member, and their surrounding area according to another embodiment of the invention, and shows the interior of the gas-liquid separator.

As another example of the dispersion means as shown in FIG. 4, a fluid introducing member 26 in which a plurality of through-holes 25 is made may be located upstream from the ion exchange resin member 20 in the gas-liquid separator 12 and a distance away from the entry-side surface 21 of the ion exchange resin member 20. As the fluid introducing member 26 is placed in the manner described above, the fluid F supplied from the circulation passage 11 into the gas-liquid separator 12 passes through the plurality of the through-holes 25 and can thereby be dispersed and made to flow to the entry-side surface 21 of the ion exchange resin member 20. Incidentally, the size, number, and positions of the through-holes 25 to be made, and other details can be decided arbitrarily.

Figure 5:
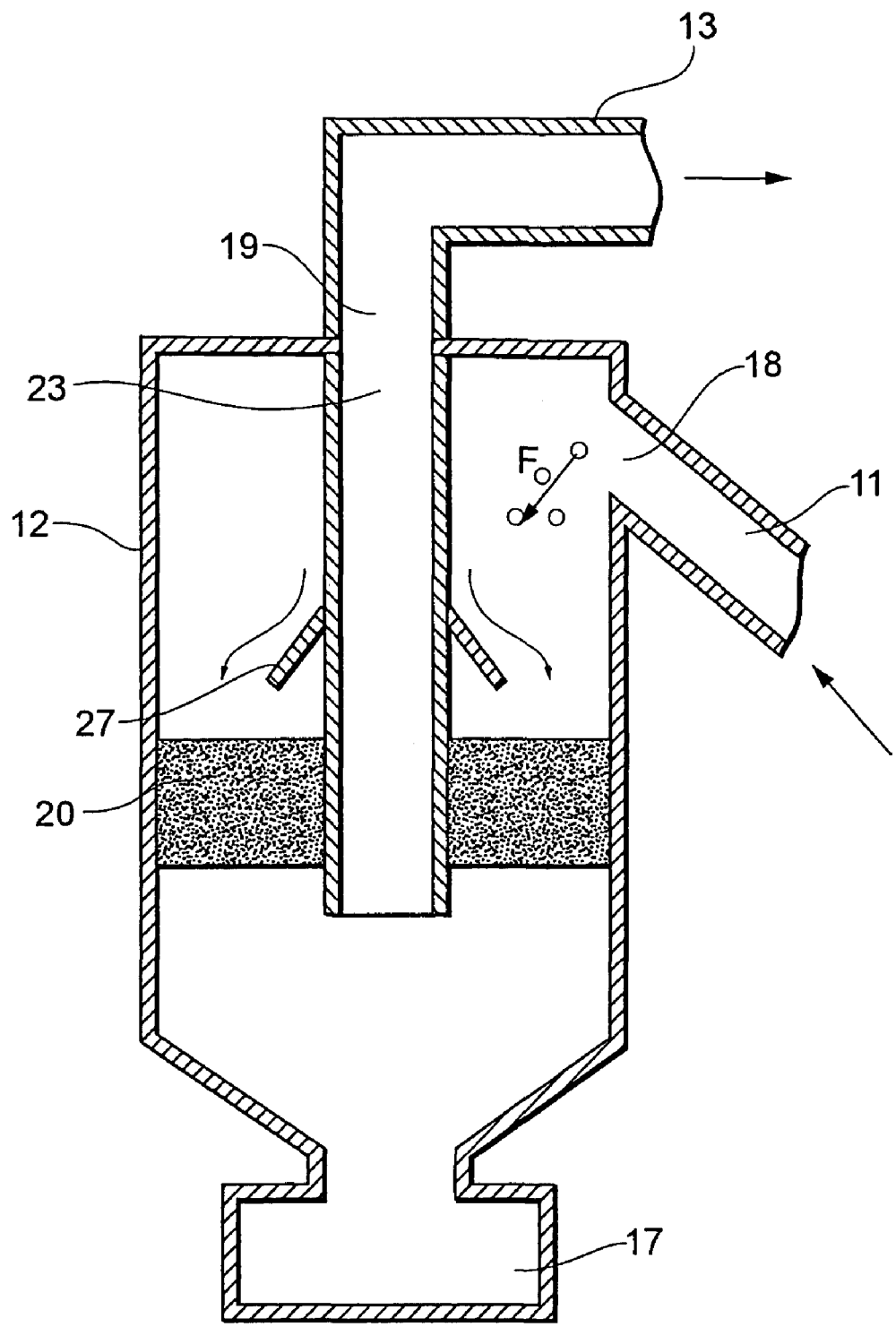
FIG. 5 is a cross-sectional view of a gas-liquid separator, an ion exchange resin member, and their surrounding area according to another embodiment of the invention.

As another example of the dispersion means as shown in FIG. 5, a direction changing member 27 that changes the traveling direction of the fluid F, which is supplied from the circulation passage 11 into the gas-liquid separator 12, to an arbitrary direction and guides the fluid F in that direction may be placed upstream from the ion exchange resin member 20 in the gas-liquid separator 12 and a distance away from the entry-side surface 21 of the ion exchange resin member 20. As the direction changing member 27 is placed in the manner described above, the fluid F supplied from the circulation passage 11 into the gas liquid separator 12 can be dispersed and made to flow to the entry-side surface 21 of the ion exchange resin member 20.

(Second Embodiment)

Next, a fuel cell system according to a second embodiment of this invention will be described with reference to the relevant drawings.

Figure 6:
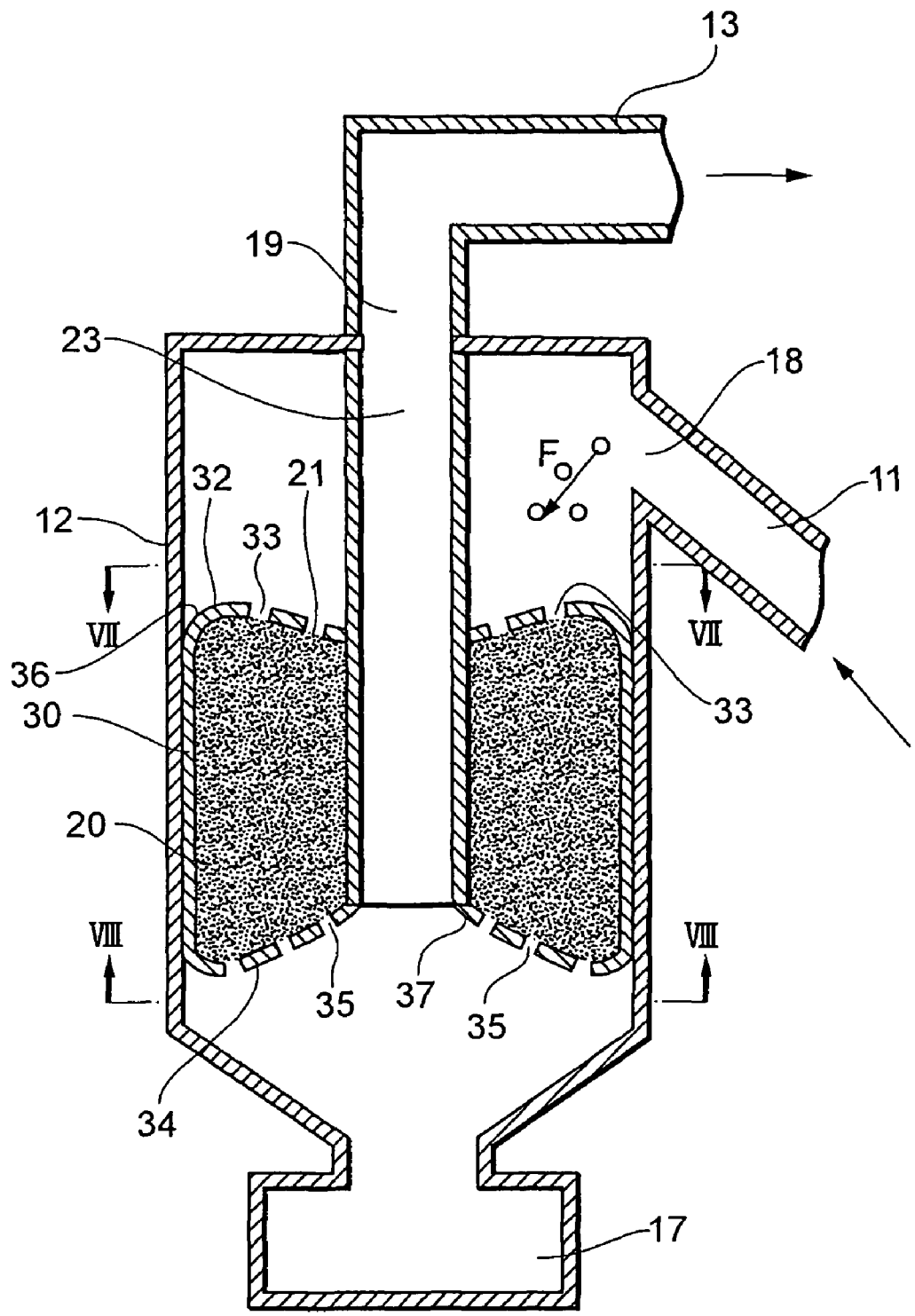
FIG. 6 is a cross-sectional view of a gas-liquid separator, an ion exchange resin member, and their surrounding area in a fuel cell system according to the second embodiment of the invention.
Figure 7:
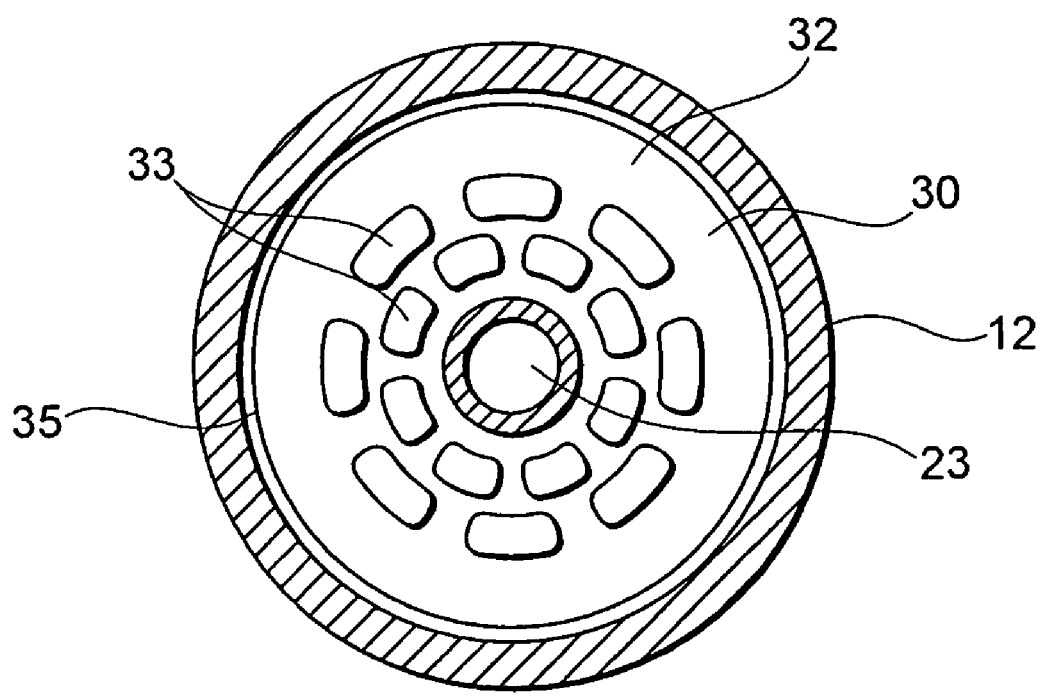
FIG. 7 is a cross-sectional view of the gas-liquid separator shown in FIG. 6 as taken along line VII-VII.
Figure 8:
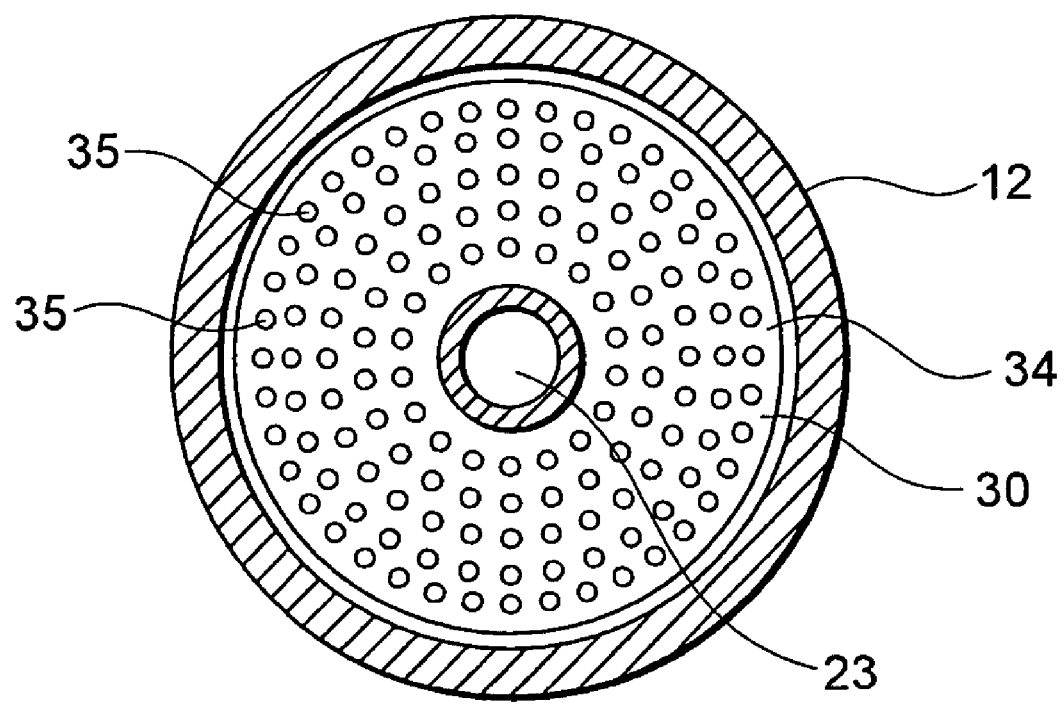
FIG. 8 is a cross-sectional view of the gas-liquid separator shown in FIG. 6 as taken along line VIII-VIII.
Figure 9:
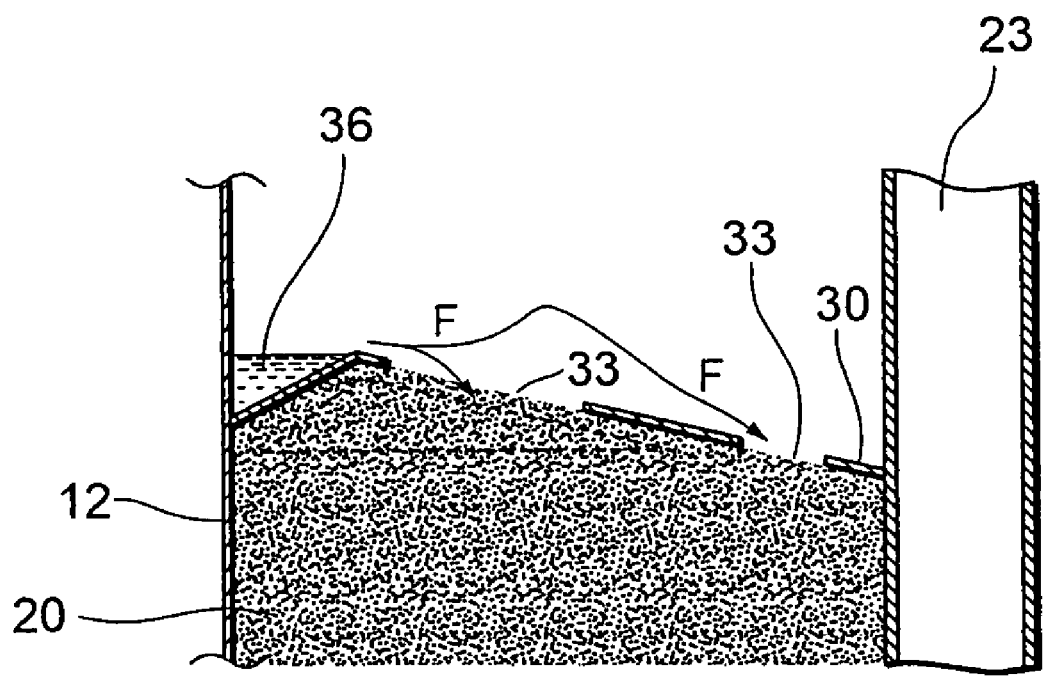
FIG. 9 is a schematic diagram illustrating the state where a fluid flows to the ion exchange resin member according to the second embodiment.

FIG. 6 is a cross-sectional view of a gas-liquid separator, an ion exchange resin member, and their surrounding area in a fuel cell system according to the second embodiment. FIG. 7 is a cross-sectional view of the gas-liquid separator shown in FIG. 6 as taken along line VII-VII. FIG. 8 is a cross-sectional view of the gas-liquid separator shown in FIG. 6 as taken along line VIII-VIII. FIG. 9 is a schematic diagram illustrating the state where a fluid flows to the ion exchange resin member according to the second embodiment.

The elements used in the second embodiment the same as those explained in the first embodiment are given the same reference numerals as in the first embodiment, and any detailed description for them has been omitted.

As shown in FIGS. 6 to 8, the difference between the fuel cell system 1 according to the second embodiment and the fuel cell system 1 according to the first embodiment is that the dispersion means is composed of a case 30 for housing the ion exchange resin member 20 in the second embodiment.

The case 30 is provided around the gas passage 23 so that the gas passage 23 is located generally in the center of the case 30. The case 30 has a hollow body in a generally cylindrical shape in which a space for housing the ion exchange resin member 20 is formed. The entry-side surface 32 (top surface in FIG. 6) of this case 30 forms an inclined plane in a bowl shape that sinks (or is depressed) from its outer periphery toward its central part. Accordingly, as shown in FIG. 9, the liquid that has fallen down to the outer periphery of the case 30 (a fluid passage 36 described below in the second embodiment) moves along the inclined plane toward the central part of the ion exchange resin member 20. Therefore, the liquid can be more evenly dispersed over the entry-side surface 21 of the ion exchange resin member 20.

The outer periphery of the entry-side surface 32 of the case 30 is slightly depressed toward the fluid outlet side so that the depressed fluid passage 36 is formed by the depressed part and the inside wall of the gas-liquid separator 12.

In the entry-side surface 32 of the case 30 as shown in FIGS. 6 and 7, there is a plurality of through-holes 33 that radiate out from the central part of the entry-side surface 32 toward its outer periphery (in two concentric circles in the second embodiment) and are located in a staggered manner. These through-holes 33 are formed so that the aperture size of the through-holes 33 closer to the outer periphery of the entry-side surface 32 is larger than that of the through-holes 33 closer to the central part of the entry-side surface 32 of the case 30. In other words, the through-holes 33 are formed so that those closer to the central part have a smaller aperture size. Accordingly, even if the length of the ion exchange resin member 20 from its inlet side to its outlet side in the outer peripheral area is longer than that in the central area, the flow rate of the liquid in relation to the liquid-flow-direction length can be kept constant and the entire ion exchange resin member 20 can be used more efficiently.

As shown in FIGS. 6 and 8, the outlet-side surface 34 (the under surface in FIG. 6), which is the fluid outlet, of the case 30 forms an inclined plane that is inclined downward from the gas passage 23 toward the outer periphery of the outlet-side surface 34. In other words, the inclined plane is formed so that it is inclined toward the direction of gravitational force and away from the gas passage 23. This inclined plane serves to guide the fluid, in particular the liquid flown to the ion exchange resin member 20 to cause the liquid to move toward the outer periphery, and concentrate the liquid in this area. A plurality of through-holes 35 is formed in the outlet-side surface 34 of the case 30 and the fluid is discharged from the through-holes 35. The through-holes 35 have a smaller aperture size than that of the through-holes 33.

A deflecting guide 37 that is bent toward a direction to move away from the gas passage 23 is formed at the boundary of the outlet-side surface 34 of the case 30 and the gas passage 23. This deflecting guide 37 serves to deflect and guide the fluid flow that has reached this area to move away from the gas passage 23.

The locations and aperture sizes of the through-holes 33 in the entry-side surface 32 of the case 30 may be decided according to the inclined plane formed on the outlet-side surface 34 of the case 30. Specifically speaking, the length of the ion exchange resin member 20 from its fluid inlet to its fluid outlet is decided by the inclined plane formed on the outlet-side surface 34 of the case 30; and the through-hole 33 formed at the position where the above-described length is long has a larger aperture size. Consequently, a large amount of the fluid flows to the outer peripheral area where the length of the ion exchange resin member 20 from its fluid inlet to its fluid outlet is long, and a small amount of the fluid flows to the area where the length of the ion exchange resin member 20 from its fluid inlet to its fluid outlet is short. Therefore, the flow rate of the liquid in relation to the liquid-flow-direction length can be kept constant and the entire ion exchange resin member 20 can be used more efficiently.

In the gas-liquid separator 12 in which the ion exchange resin member 20 contained in the case 30 is provided, the fluid F (gas-liquid mixture) supplied from the circulation passage 11 becomes a turbulent flow such as a swirling flow (cyclone) and is then supplied to the ion exchange resin member 20 in the same manner as in the first embodiment. At this moment, most of the liquid, such as the generated water, in the fluid F dribbles down the inside wall of the gas-liquid separator 12 and is then received by the fluid passage 36. The liquid received by the fluid passage 36 then circulates around the outer periphery of the fluid passage 36; and the liquid that has spilled out of the fluid passage 36 moves over the inclined plane formed on the entry-side surface 32 of the case 30, passes through the through-holes 33, and is dispersed over, and made to flow to, into the entire ion exchange resin member 20.

Since the through-holes 33 are formed in a staggered manner as described above, the liquid runs over the inclined plane and can also reach the through-holes 33 closer to the inner periphery of the case 30. Since the through-holes 33 located closer to the outer periphery of the ion exchange resin member 20 have a larger aperture size than that of the through-holes 33 located closer to the central part of the ion exchange resin member 20, even if the length of the ion exchange resin member 20 from its fluid inlet to its fluid outlet in the outer peripheral area is longer than that in the central area, the flow rate of the liquid in relation to the liquid-flow-direction length can be kept constant and the entire ion exchange resin member 20 can be used more efficiently.

The gas (hydrogen) in the fluid that has flown into the ion exchange resin member 20 passes through the ion exchange resin member 20, moves toward a lower part of the gas-liquid separator 20, and then moves via the gas passage 23 toward the circulation passage 13 in the same manner as in the first embodiment.

On the other hand, impurities contained in the liquid in the fluid F that has flown into the ion exchange resin member 20 are absorbed by the ion exchange resin member 20. This liquid passes through the ion exchange resin member 20, moves toward a lower part of the ion exchange resin member 20, and then moves along the inclined plane formed on the outlet-side surface 34 of the case 30 toward the outer periphery of the ion exchange resin member 20, and accumulates intensively in this outer peripheral area. Consequently, the mass of the liquid can be increased. Therefore, it is possible to increase the kinetic (gravitational) energy of the liquid relative to the gas and separate the gas-liquid mixture efficiently. Also, gravity makes it easier for the liquid to move toward the water exhaust port 17.

Furthermore, the liquid is discharged from the through-holes 35 formed in the outlet-side surface 34 of the case 30. When this happens, the size of the liquid droplets is increased around the through-holes 35. Accordingly, it is possible to more reliably prevent the liquid from, for example, being caught by the gas in the gas cyclone and thereby moving toward the gas passage 23. The liquid discharged from the through-holes 35 moves, due to gravity, from the lower part of the gas-liquid separator 12 to the water discharge port 17.

Furthermore, the fluid that has reached the vicinity of the gas passage 23 in the ion exchange resin member 20 is guided by the deflecting guide 37 in a direction to move away from the gas passage 23. Accordingly, the liquid is further prevented from being caught by the gas cyclone and taken into the gas passage 23.

The second embodiment described the fluid passage 36 being formed between the inside wall of the gas-liquid separator 12 and the case 30. However, the configuration of the invention is not limited to this example, and the fluid passage 36 may not always be formed. Even if the fluid passage 36 is not formed, the liquid that has fallen down to the vicinity of the outer periphery of the case 30 can move along the inclined plane formed on the entry-side surface 32 of the case 30, pass through the through-holes 33, and be dispersed over and made to flow to the entire ion exchange resin member 20.

The inclination angle of the inclined plane formed on the entry-side surface 32 of the case 30 can be decided arbitrarily.

Furthermore, the second embodiment described the plurality of through-holes 33 being arranged in a radiating and staggered manner. However, the through-holes 33 are not limited to one in this example, and the size, locations, positional pattern, and number of through-holes 33 to be made can be decided arbitrarily.

Furthermore, the second embodiment described the case where the inclined plane is formed at the fluid outlet of the ion exchange resin member 20 (the outlet-side surface 34), and the through-holes 35 and the deflecting guide 37 are formed, and the fluid is discharged from the through-holes 35. However, the configuration of the invention is not limited to this example, and only the inclined plane may be formed at the fluid outlet of the ion exchange resin member 20, or only the through-holes 35 may be formed without inclining the fluid outlet of the ion exchange resin member 20, or only the deflecting guide 37 may be provided. Also, any two of these elements may be combined as appropriate.

Furthermore, the inclination angle of the inclined plane formed at the fluid outlet of the case 30, and the number and locations of the through-holes 35 to be made can be decided arbitrarily.

The second embodiment described the inclined plane being formed at the fluid inlet of the ion exchange resin member 20 and the plurality of through-holes 33 being formed. However, the configuration of the invention is not limited to this example, and the shape of the fluid inlet of the ion exchange resin member 20 may be decided arbitrarily.

(Third Embodiment)

A fuel cell system according to a third embodiment of the invention will be described below with reference to the relevant drawings.

Figure 10:
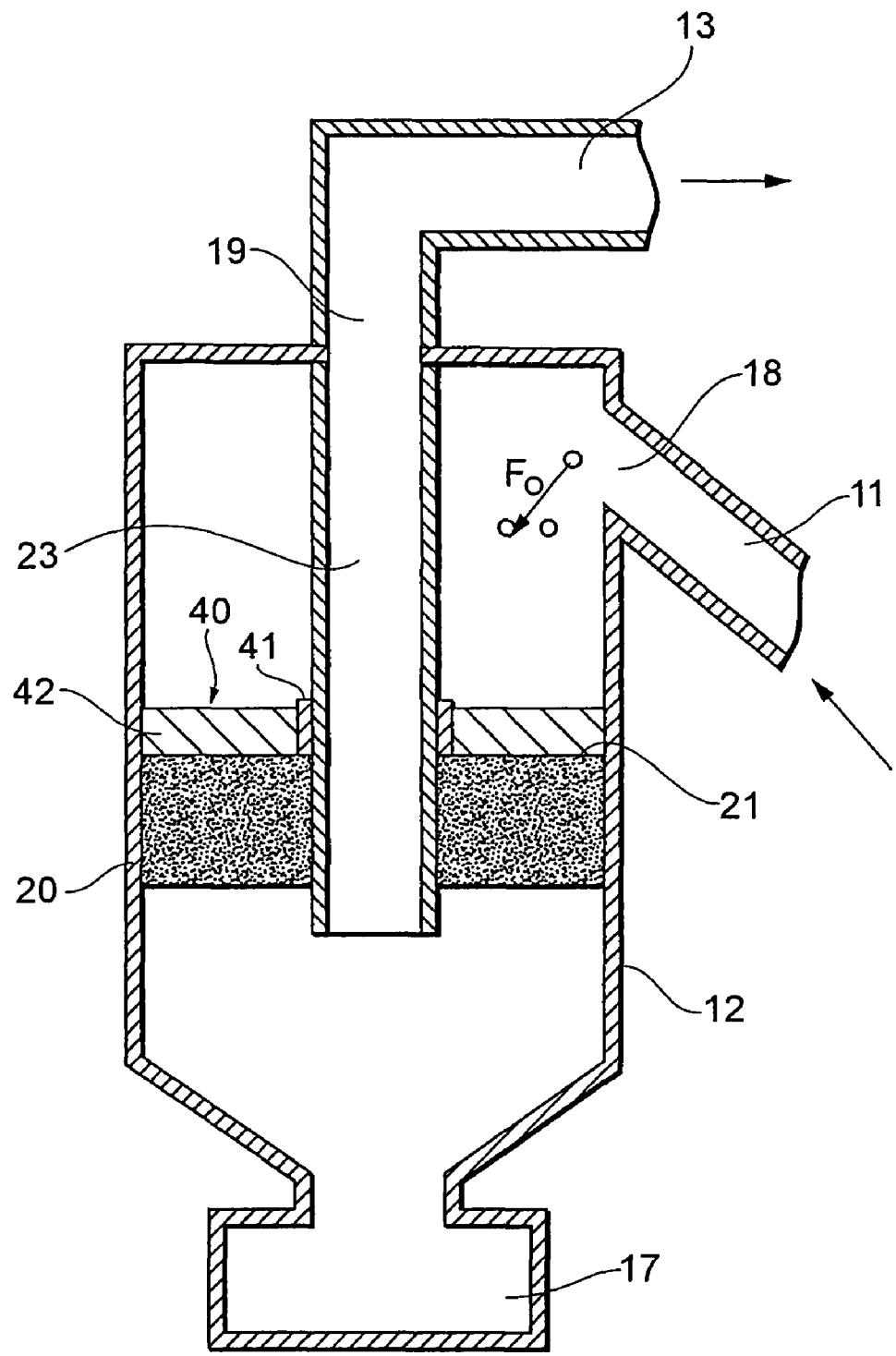
FIG. 10 is a cross-sectional view of a gas-liquid separator, an ion exchange resin member, and their surrounding area in a fuel cell system according to the third embodiment of the invention.
Figure 11:
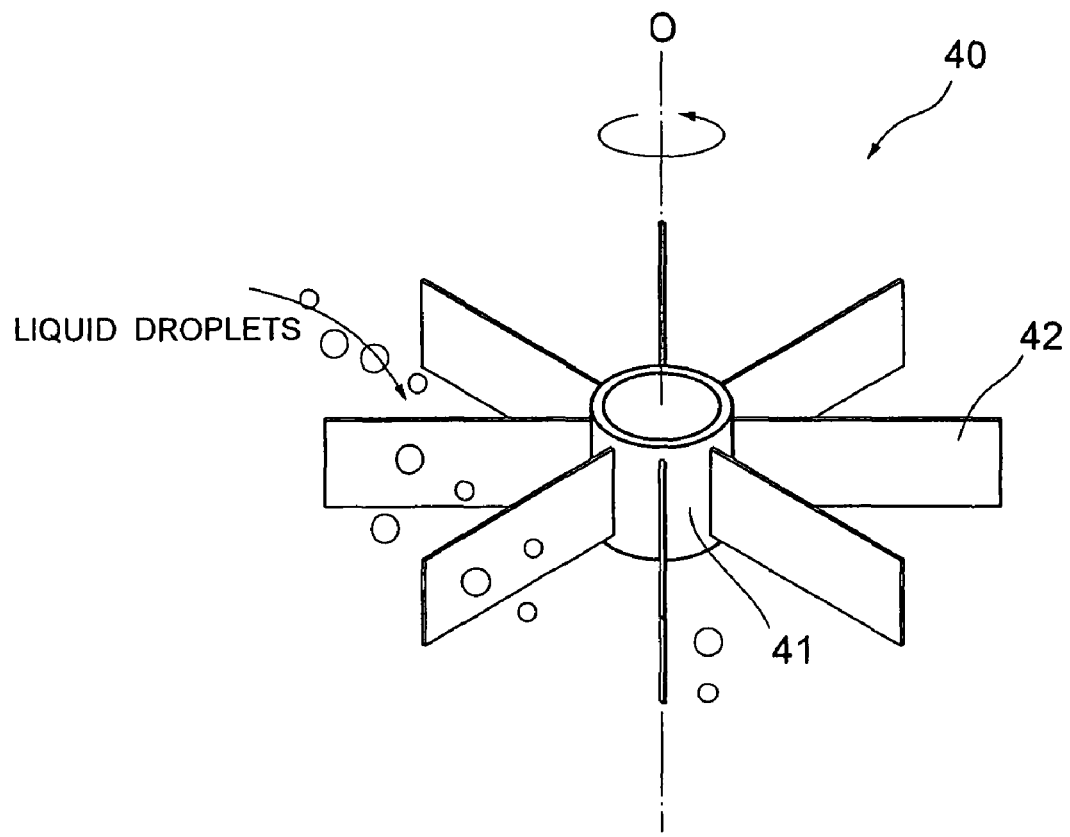
FIG. 11 is a perspective view of a rotor blade member that is a dispersion means located in the ion exchange resin member shown in FIG. 10.

FIG. 10 is a cross-sectional view of a gas-liquid separator, an ion exchange resin member, and their surrounding area in a fuel cell system according to the third embodiment. FIG. 11 is a perspective view of a rotor blade member that is a dispersion means located in the ion exchange resin member shown in FIG. 10.

The elements used in the third embodiment the same as those explained in the first embodiment are given the same reference numerals as in the first embodiment, and any detailed description of them has been omitted.

The difference between the fuel cell system 1 according to the third embodiment and the fuel cell system 1 according to the first embodiment is that the dispersion means is composed of a rotor blade member 40 according to the third embodiment as shown in FIGS. 10 and 11.

As shown in FIG. 11 in particular, the rotor blade member 40 includes: a rotation shaft 41 mounted around the outer periphery of the gas passage 23 formed inside the gas-liquid separator 12 so that the rotation shaft 41 can rotate; and eight rotor blades 42 extending out from the rotation shaft 41 at evenly spaced positions. These rotor blades 42 extend in a direction (radial direction) generally perpendicular to the central axis direction O of the rotation shaft 41 and are formed at the positions in contact with the entry-side surface 21 of the ion exchange resin member 20. The rotor blades 42 can be rotated by the swirling flow of the fluid F supplied into the gas-liquid separator 12.

Just like the first embodiment, the fluid F (gas-liquid mixture) supplied from the circulation passage 11 becomes a turbulent flow, such as in a swirling flow (cyclone), in the gas-liquid separator 12 containing the ion exchange resin member 20 equipped with the rotor blade member 40. When this happens, the swirling flow rotates the rotor blade member 40, causing the fluid F to splash like a sprinkler. As a result, the fluid can be evenly dispersed over and made to flow to the entry-side surface 21 of the ion exchange resin member 20.

Since the rotor blades 42 are placed in contact with the entry-side surface 21 of the ion exchange resin member 20, the fluid (the liquid in particular) that has fallen down to the entry-side surface 21 can be gathered by the rotor blades 42 and be more evenly dispersed over the entry-side surface 21.

Just like the first embodiment, the liquid which has flown into the ion exchange resin member 20 dribbles down the inside wall of the gas-liquid separator 12 and received by the water discharge port 17, while hydrogen passes through the ion exchange resin member 20, moves toward the lower part of the gas-liquid separator 12, and then moves via the gas passage 23 toward the circulation passage 13. Moreover, impurities contained in the liquid are absorbed by the ion exchange resin member 20.

Figure 12:
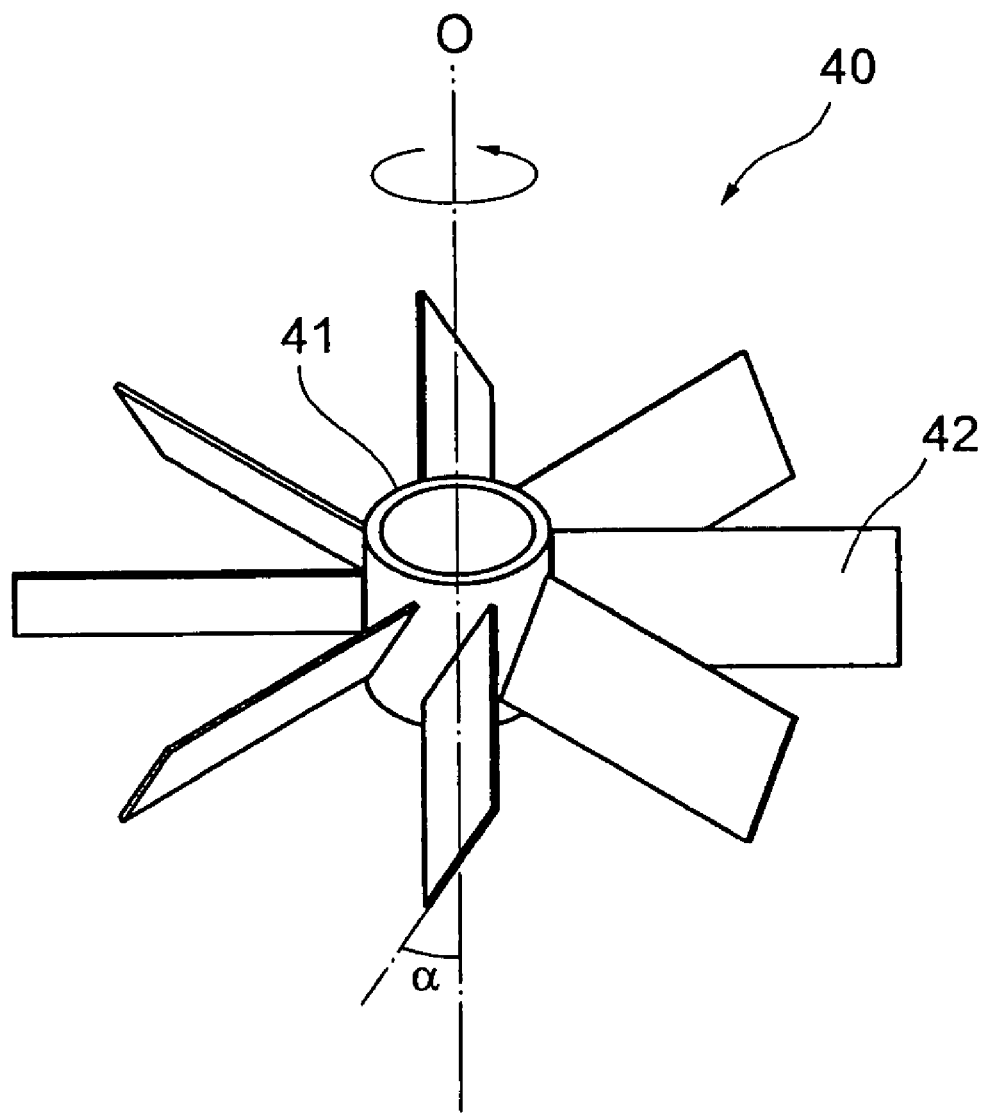
FIG. 12 is a perspective view of a rotor blade member that is a dispersion means according to another embodiment of the invention.

The third embodiment describes the rotor blades 42 formed extending in a direction (radial direction) generally perpendicular to the central axis direction O of the rotation shaft 41. However, the configuration of the invention is not limited to this example, and as shown in FIG. 12 for example, the rotor blades 42 may be inclined at a specified angle a relative to the central axis direction O of the rotation shaft 41. When the rotor blades 42 are inclined in this manner, even if the rotary force of the rotor blade member 40 decreases, the fluid F can be made to splash as if releasing it with a sprinkler.

Figure 13:
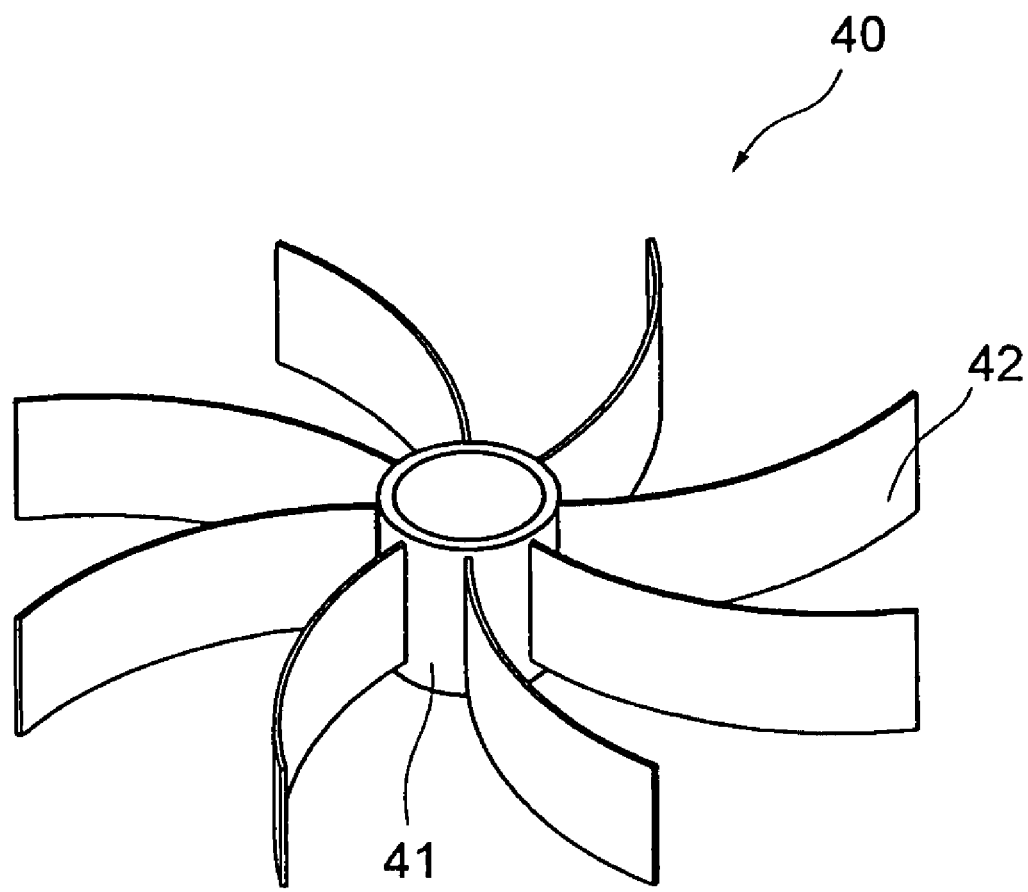
FIG. 13 is a perspective view of a rotor blade member that is a dispersion means according to another embodiment of the invention.
Figure 14:
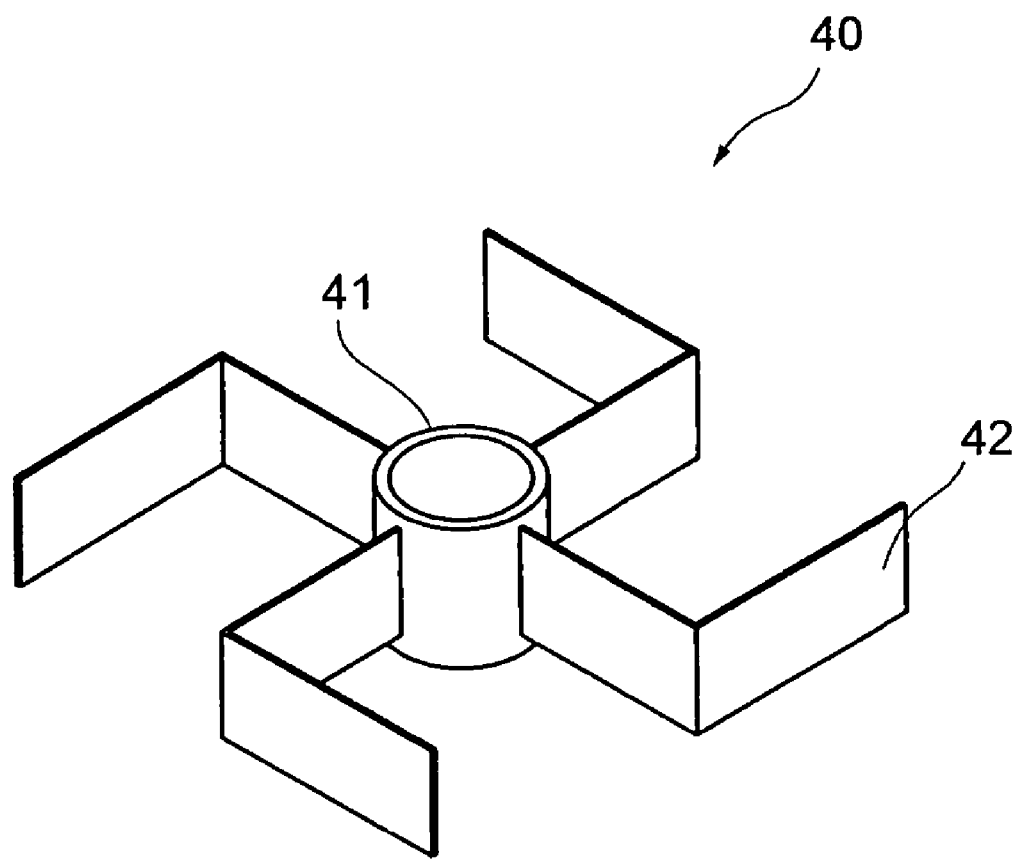
FIG. 14 is a perspective view of a rotor blade member that is a dispersion means according to another embodiment of the invention.

According to another embodiment as shown in FIG. 13, the rotor blades 42 may be configured so that they gradually bend toward the rotation shaft 41 direction away from the rotation shaft 41. Alternately, the rotor blades 42 may be bent toward the rotation shaft direction at a specified position away from the rotation shaft 41 as shown in FIG. 14. Consequently, the liquid can be made to actively splash also toward the inside direction of the rotor blade member 40. The rotor blades 42 having the above-described configurations may also be inclined at a specified angle a relative to the central axis direction O of the rotation shaft 41 as shown in FIG. 12.

Figure 15:
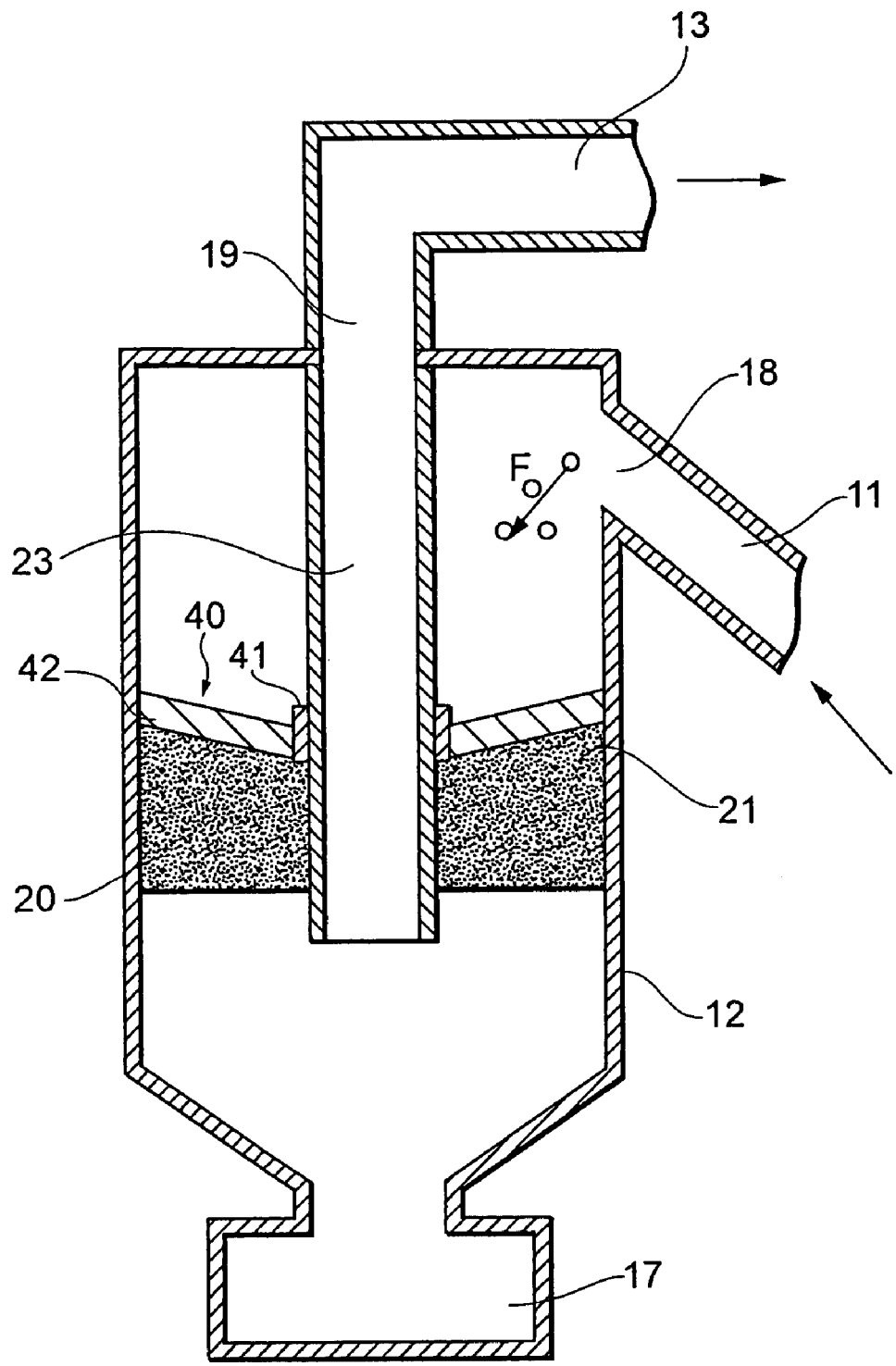
FIG. 15 is a cross-sectional view of a gas-liquid separator, an ion exchange resin member, and their surrounding area according to another embodiment of the invention.

According to another embodiment as shown in FIG. 15, the rotor blades 42 may be inclined (sloped) from the rotation shaft 41 toward the outer periphery so that the rotation shaft 41 sides of the rotor blades 42 are depressed toward the fluid outlet side. In this case, an inclined plane that is complementary to the inclination of the rotor blades 42 should preferably be formed on the entry-side surface 21 of the ion exchange resin member 20. Consequently, the liquid that has fallen down to the outer peripheral area of the rotor blade member 40 can be moved more easily toward the rotation shaft 41 direction and also be dispersed more evenly over the entry-side surface 21. The rotor blades 42 having the above-described configuration may also be inclined at a specified angle α relative to the central axis direction O of the rotation shaft 41 as shown in FIG. 12.

Figure 16:
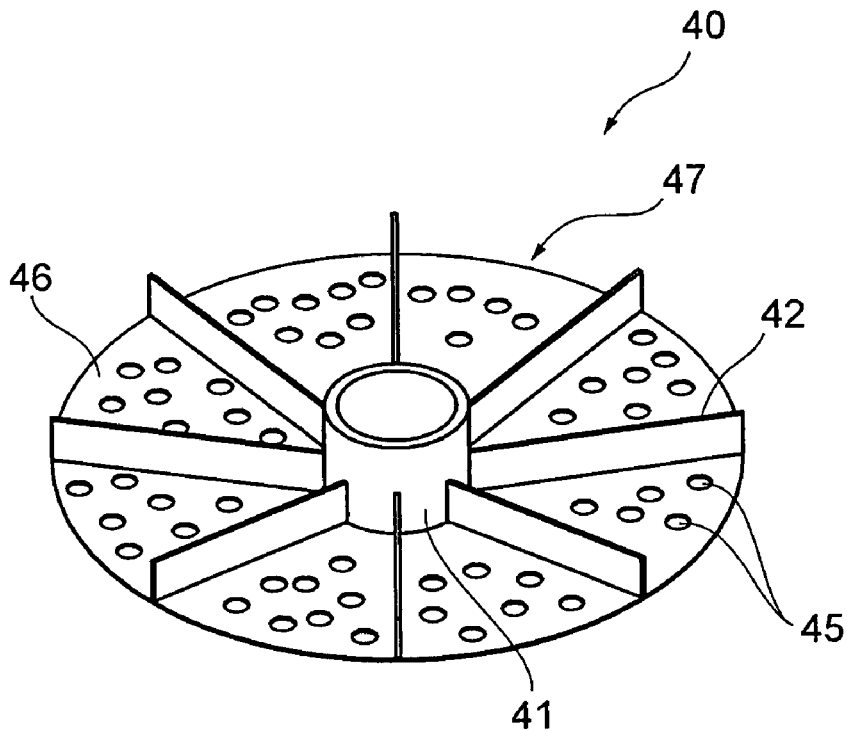
FIG. 16 is a perspective view of a rotor blade member that is a dispersion means according to another embodiment of the invention.

Furthermore, according to another embodiment as shown in FIG. 16, a porous member 46, in which a plurality of through-holes 45 is formed may be placed downstream from the rotor blades 42 (underside in this embodiment). Consequently, spaces (room) 47 formed by the rotor blades 42 and the porous member 46 can. receive the fluid F, in particular the liquid. Accordingly, after the liquid has been received these spaces 47, the liquid can pass through the through-holes 45 in the porous member 46 and reach the entry-side surface 21 of the ion exchange resin member 20. As a result, the liquid can be more evenly dispersed and made to flow to the entry-side surface 21.

The plurality of through-holes 45 in the porous member 46 can be placed in a manner radiating out from the rotation shaft 41 and in a staggered manner. Consequently, the liquid can be more evenly dispersed and made to flow to the entry-side surface 21 of the ion exchange resin member 20.

Figure 17:
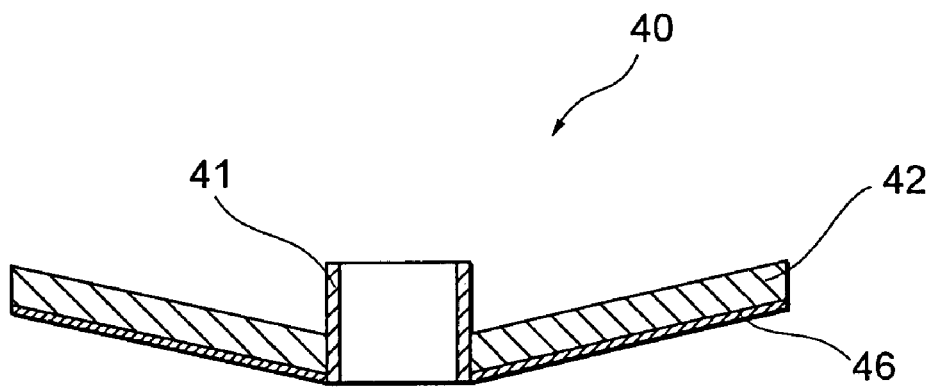
FIG. 17 is a cross-sectional view of a rotor blade member that is a dispersion means according to another embodiment of the invention.

Furthermore, as shown in FIG. 17, the porous member 46 may be inclined (sloped) from the rotation shaft 41 toward the outer periphery so that the rotation shaft 41 side of the porous member 46 is depressed toward the fluid outlet side. Consequently, the liquid which has fallen down to the porous member 46 can be moved more easily toward the rotation shaft 41 direction and also be dispersed more evenly over the entry-side surface 21. Also in this case, an inclined plane that is complementary to the inclination of the porous member 46 should ideally be formed on the entry-side surface 21 of the ion exchange resin member 20.

The third embodiment described the rotor blade member 40 being placed in contact with the entry-side surface 21 of the ion exchange resin member 20 so that the rotor blade member can rotate. However, the configuration of the invention is not limited to this case, and the rotor blade member 40 may be located upstream from and a distance away from the entry-side surface 21 of the ion exchange resin member 20.

The size, number, and inclination angle (α) of the rotor blades 42 to be provided can be decided arbitrarily.

Also, it should be understood that the dispersion means described in the first to the third embodiments can be applied not only to the gas-liquid separator 12 of the type separating gas from liquid by utilizing the swirling flow (cyclone system), but also to other types of gas-liquid separators that separate gas from liquid by utilizing, for example, a pressure difference or a temperature difference.

(Fourth Embodiment)

Next, a fuel cell system according to a fourth embodiment of the invention will be described below with reference to the relevant drawings.

Figure 18:
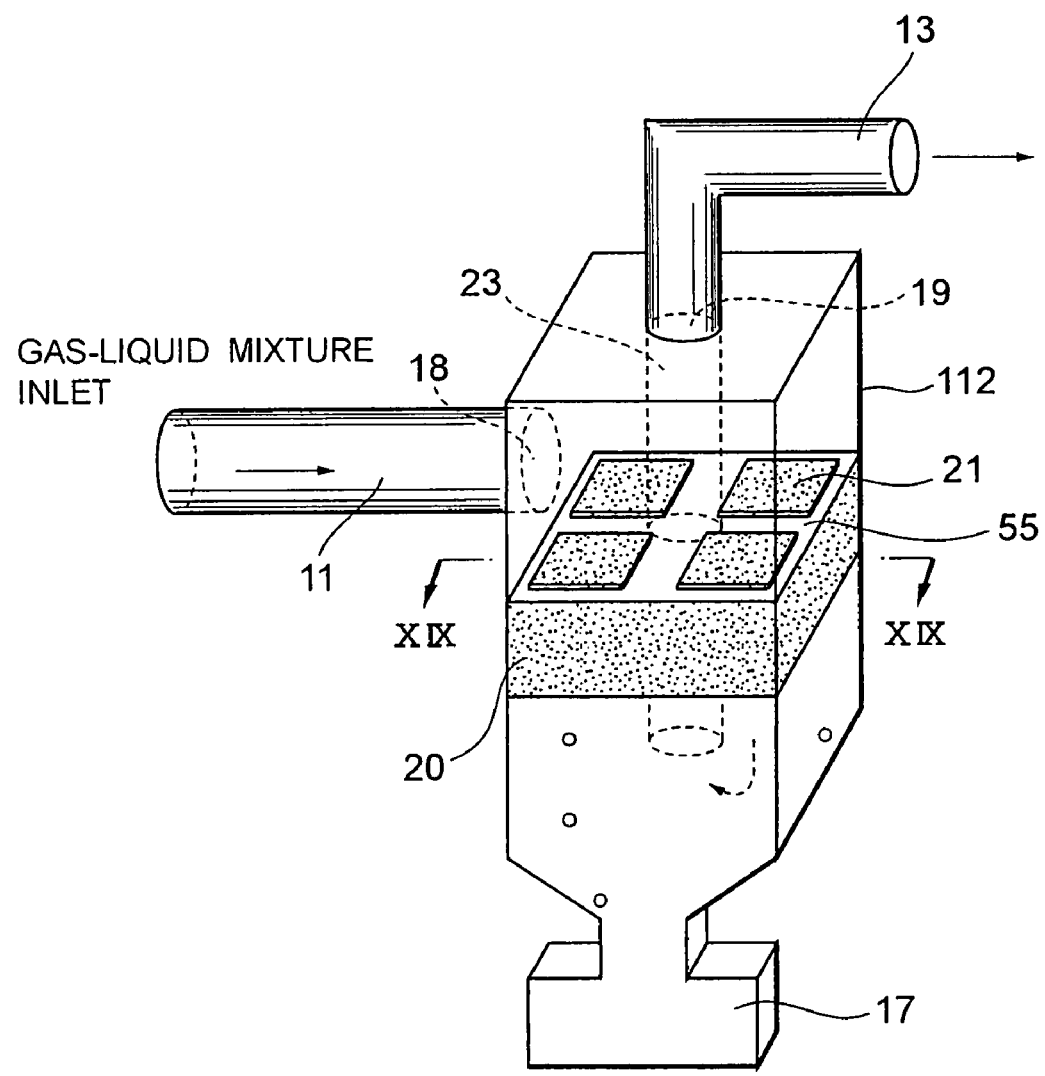
FIG. 18 is a perspective view of a gas-liquid separator, an ion exchange resin member, and their surrounding area in a fuel cell system according to the fourth embodiment of the invention, and shows the interior of the gas-liquid separator.
Figure 19:
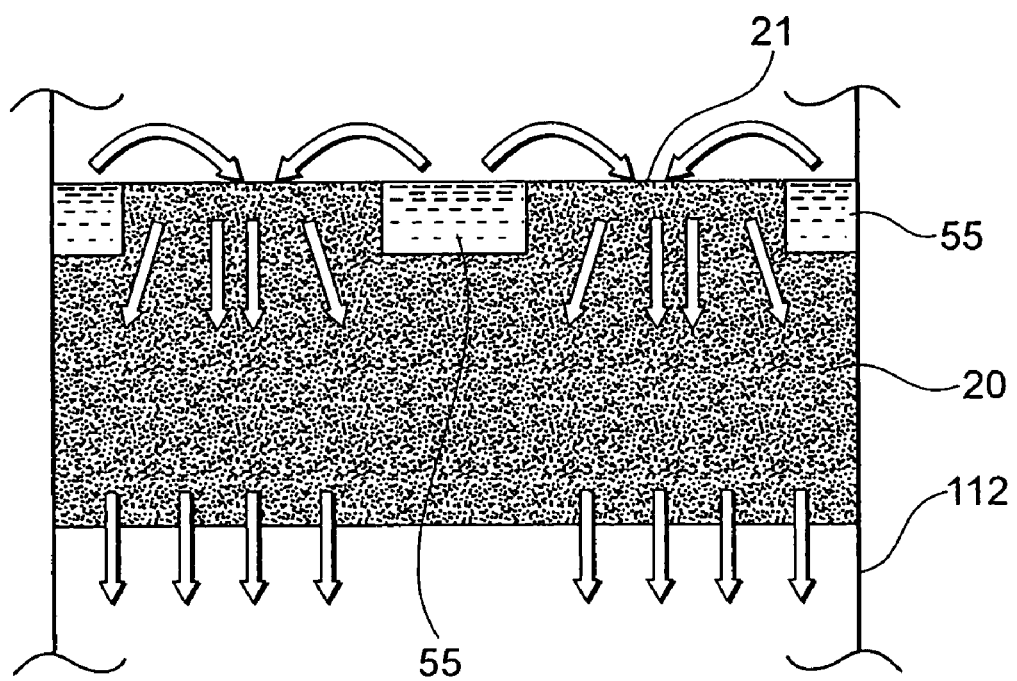
FIG. 19 is an enlarged cross-sectional view of the gas-liquid separator as taken along line XIX-XIX shown in FIG. 18, and shows the state where the fluid flows to the ion exchange resin member.

FIG. 18 is a perspective view of a gas-liquid separator, an ion exchange resin member, and their surrounding area in a fuel cell system according to the fourth embodiment, and shows the interior of the gas-liquid separator. FIG. 19 is a cross-sectional view of the gas-liquid separator as taken along line XIX-XIX shown in FIG. 18 and shows the state where the fluid flows to the ion exchange resin member.

The elements used in the fourth embodiment the same as those explained in the first embodiment are given the same reference numerals as in the first embodiment, and any detailed description of them has been omitted.

As shown in FIGS. 18 and 19, the difference between the fuel cell system 1 according to the fourth embodiment and the fuel cell system 1 according to the first embodiment is the gas-liquid separation system of a gas-liquid separator 112 and the shape of a fluid passage 55 in the entry-side surface 21 of the ion exchange resin member 20.

As shown in FIG. 18 in particular, the gas-liquid separator 112 has a hollow body of a generally square pole shape that has: a gas-liquid inlet 18 for introducing hydrogen and water discharged from the circulation passage 11; and a gas outlet 19 for discharging gas separated in the gas-liquid separator 112. This gas-liquid separator 112 utilizes a pressure difference and other factors, but not a swirling flow, to separate the fluid F (gas-liquid mixture) introduced from the gas-liquid inlet 18 into gas and liquid.

The water discharge port 17 for receiving and discharging the water separated by the gas-liquid separator 112 is formed at the lower part of the gas-liquid separator 112. This water discharge port 17 includes a drain valve (not shown in the drawing) that discharges only the water separated by the gas-liquid separator 112, without discharging the hydrogen.

The fluid passage 55 that is the dispersion means for dispersing the fluid F over, and making it flow to, the entry-side surface 21 is formed in the entry-side surface 21 of the ion exchange resin member 20 placed inside the gas-liquid separator 112. As shown in FIG. 19 in particular, this fluid passage 55 includes: a peripheral groove defined by a recess formed along the outer periphery (four sides) of the ion exchange resin member 20 and the inside wall of the gas-liquid separator 112; and a cross groove that is connected to the peripheral groove so as to allow the liquid to flow therebetween and divides the entry-side surface 21 of the ion exchange resin member 20 into four sections. The gas passage 23 passes through the central part of the cross groove. The fluid passage 55 is designed so that the liquid such as the generated water received by this fluid passage 55 circulates around the entire fluid passage 55.

Incidentally, this fluid passage 55 may be formed in, for example, a resin case (not shown in the drawing) for protecting the ion exchange resin, which is the component of the ion exchange resin member 20.

As mentioned above, this gas-liquid separator 112 is not of the type like the gas-liquid separator 12 described in the first embodiment that separates gas from liquid by utilizing a swirling flow. As the fluid F (gas-liquid mixture) is supplied from the circulation passage 11 at a specified speed, pressure, etc., the fluid F collides with the inside wall of the gas-liquid separator 112 and most of the liquid such as the generated water in the fluid F dribbles down the inside wall of the gas-liquid separator 112 and is then received by the fluid passage 55. When this happens, the fluid F also collides with the outside wall of the gas passage 23 and the liquid dribbles down this outside wall and is then received by the fluid passage 55.

The liquid received by this fluid passage 55 circulates around the fluid passage 55, and the liquid that spills over the fluid passage 55 then flows to the ion exchange resin member 20. Accordingly, the liquid can be dispersed over and made to flow to the entire ion exchange resin member 20, and the entire ion exchange resin member 20 can be used efficiently.

Just like the first embodiment, the liquid that has flowed into the ion exchange resin member 20 dribbles down the inside wall of the gas-liquid separator 112 and is then received by the water discharge port 17, while the hydrogen passes through the ion exchange resin member 20, moves toward the lower part of the gas-liquid separator 112, and then moves via the gas passage 23 toward the circulation passage 13 by means of, for example, a pressure difference. Also, impurities contained in the liquid are absorbed by the ion exchange resin member 20.

Figure 20:
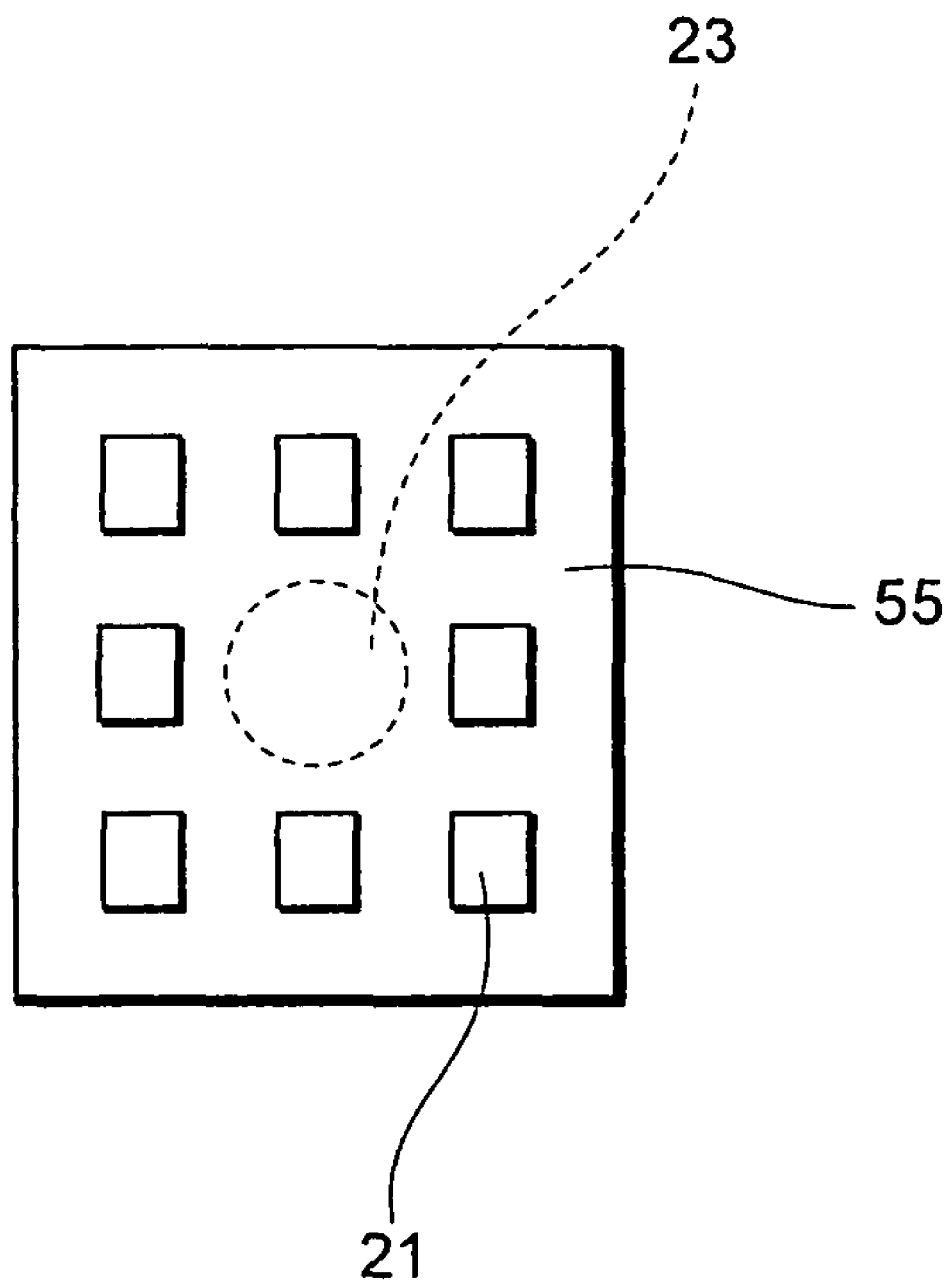
FIG. 20 is a plane view of a fluid passage that is a dispersion means, and an ion exchange resin member according to another embodiment of the invention.
Figure 21:
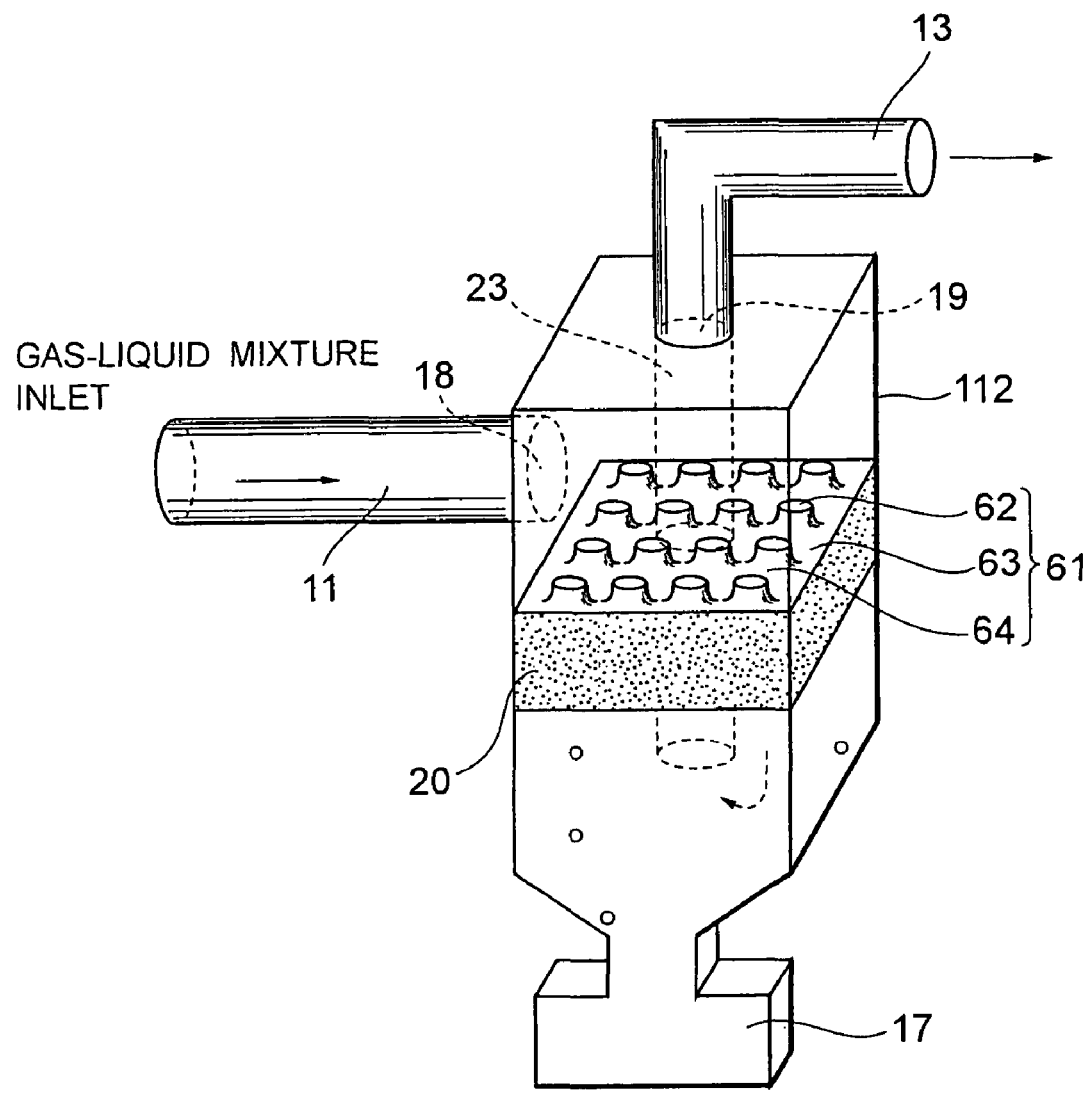
FIG. 21 is a perspective view of a gas-liquid separator, an ion exchange resin member, and their surrounding area in a fuel cell system according to another embodiment of the invention and shows the interior of the gas-liquid separator.
Figure 22:
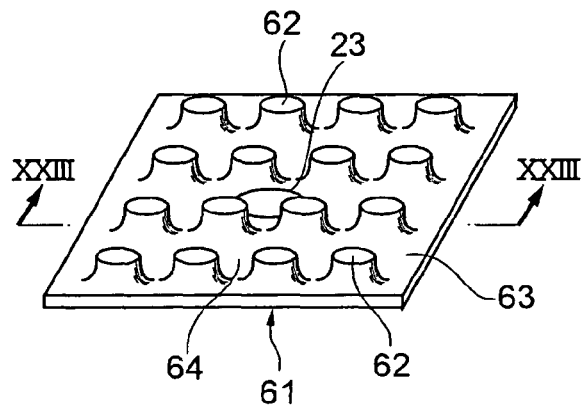
FIG. 22 is a perspective view of a dispersion means according to another embodiment of the invention.
Figure 23:
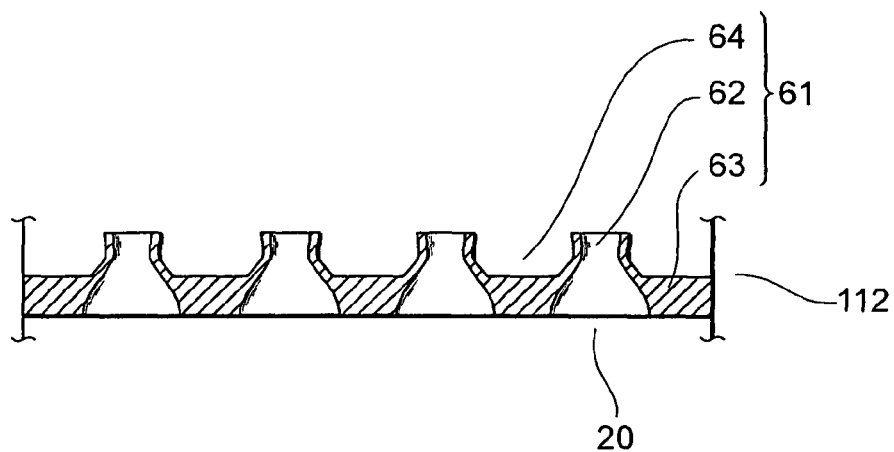
FIG. 23 is a cross-sectional view of the dispersion means shown in FIG. 22 as taken along line XXIII-XXIII.

The fourth embodiment describes the fluid passage 55 being composed of the groove formed around the outer periphery (four sides) of the entry-side surface 21 of the ion exchange resin member 20 and the groove formed to divide the entry-side surface 21 into four sections. However, the configuration of the fluid passage 55 is not limited to this example, and the fluid passage 55 may divide the entry-side surface 21 of the ion exchange resin member 20 into smaller sections as shown in FIG. 20. Consequently, the liquid can be further dispersed over and made to flow to the entry-side surface 21.

Figure 24:
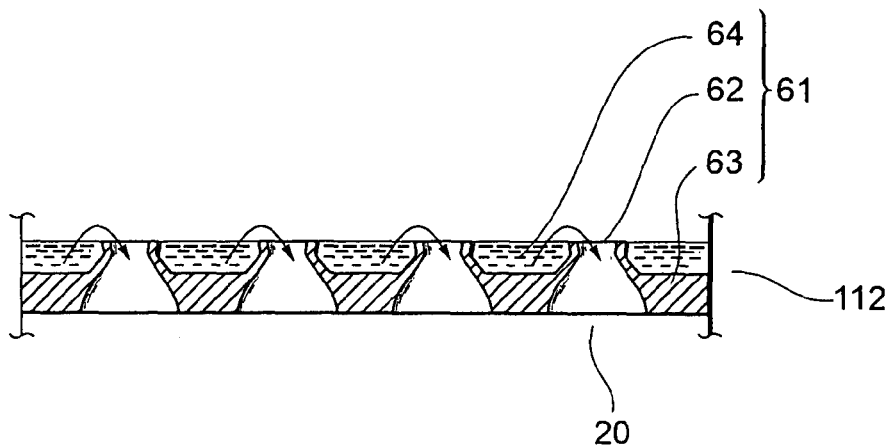
FIG. 24 is a schematic cross-sectional view illustrating the state where the liquid collected in recesses formed in the dispersion means shown in FIG. 23 flows through protruding holes into the ion exchange resin member.

As a dispersion means having another configuration for dispersing the fluid F over, and making it flow to, the entry-side surface 21 of the ion exchange resin member 20, a fluid introducing member 61, in which a plurality of protruding holes 62 is formed on a flat plate 63 by means of metal punching may be used as shown in FIGS. 21 to 24. In the fluid introducing member 61 as shown in FIG. 24 in particular, the liquid supplied from the circulation passage 11 accumulates in recesses 64 defined by the protruding holes 62 and the liquid that spills out of the recesses 64 flows via the protruding holes 62 into the ion exchange resin member 20. Accordingly, the liquid can be dispersed over and made to flow to the entire ion exchange resin member 20, and the entire ion exchange resin member 20 can be used efficiently.

Figure 25:
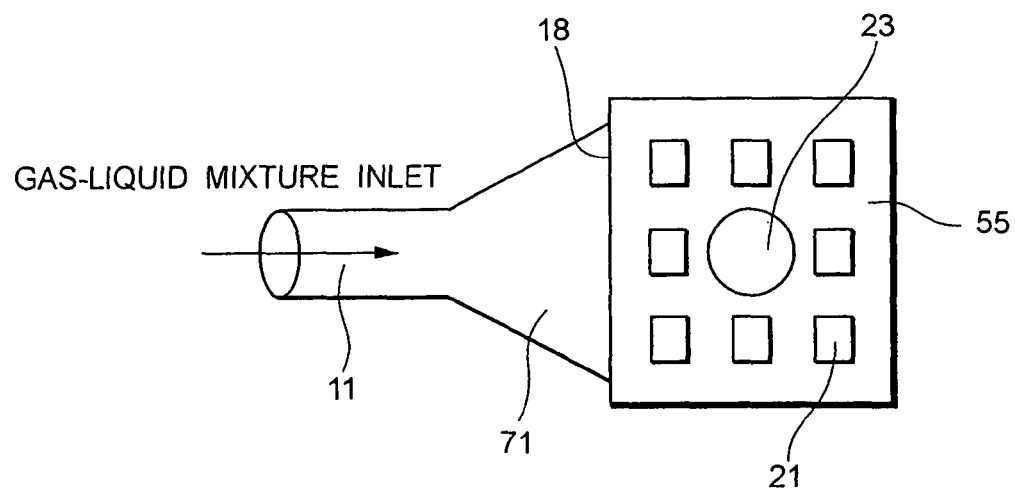
FIG. 25 is a schematic plane view of a dispersion means and its surrounding area according to another embodiment of the invention.
Figure 26:
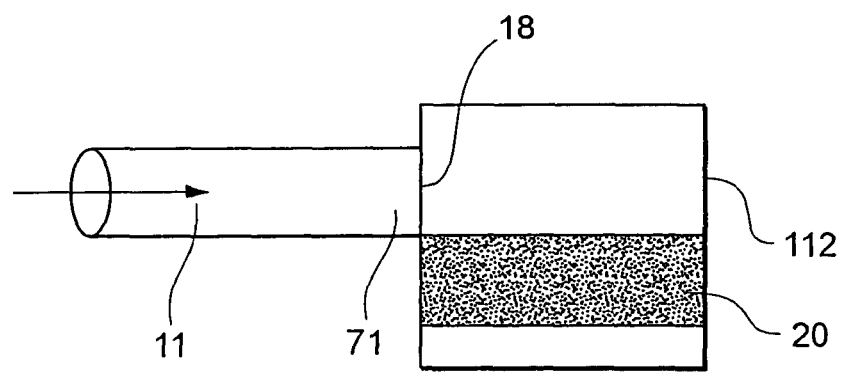
FIG. 26 is a schematic side view of a dispersion means and its surrounding area according to another embodiment of the invention.

According to another embodiment as shown in FIG. 25, the gas-liquid inlet 18 may be widened and a generally fan-shaped nozzle passage 71 whose width increases toward its top end may be placed between the circulation passage 11 and the gas-liquid inlet 18, thereby preventing disproportionate supply of the fluid F to the entry-side surface 21 of the ion exchange resin member 20. In this case, the dispersion means may be composed of only this nozzle passage 71 as shown in FIG. 26, or both the nozzle passage 71 and the fluid passage 55 may constitute the dispersion means as shown in FIG. 25.

Figure 27:
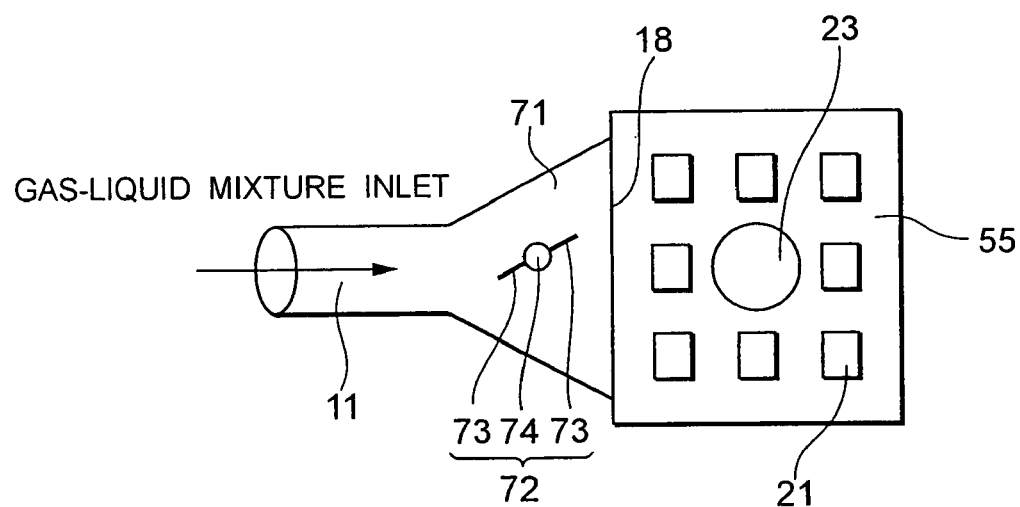
FIG. 27 is a schematic plane view of a dispersion means and its surrounding area according to another embodiment of the invention.

According to another embodiment as shown in FIG. 27, a direction changer 72 for changing the fluid F supply direction to directions different from the direction in which the fluid F normally flows to the entry-side surface 21 of the ion exchange resin member 20 by controlling the flowing direction of the fluid F according to the status of the fluid F supplied from the circulation passage 11 may be provided in the nozzle passage 71. This direction changer 72 has two vanes 73 in a straight line that passes through a rotation shaft 74. The direction changer 72 rotates around the rotation shaft 74 for a specified number of degrees, so that it can change the aperture size of the nozzle passage 71 for allowing the fluid F to pass through, and also change the traveling direction of the fluid F.

It is possible to prevent disproportionate supply of the fluid to the entry-side surface 21 of the ion exchange resin member 20 by providing such a direction changer 72 that serves as the dispersion means. Also in this case, the nozzle passage 71 and the direction changer 72 may constitute the dispersion means as shown in FIG. 28, or the fluid passage 55 may also be used together with the nozzle passage 71 and the direction changer 72 to constitute the dispersion means as shown in FIG. 27.

Figure 28:
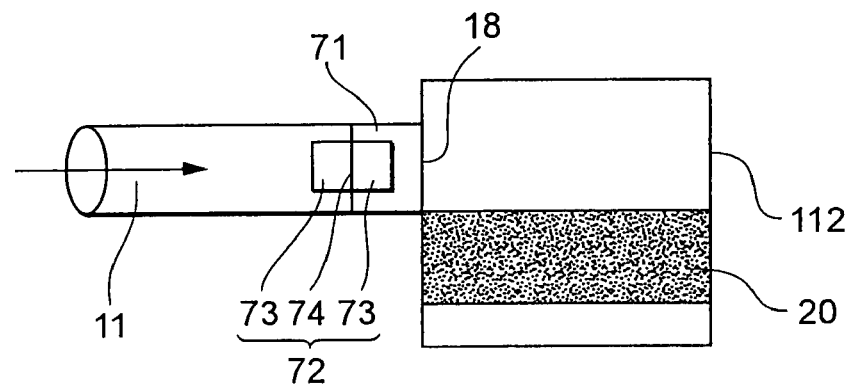
FIG. 28 is a schematic side view of a dispersion means and its surrounding area according to another embodiment of the invention.

When the dispersion means is composed of the nozzle passage 71 and the direction changer 72 as shown in FIG. 28, a fluid-supply-status-changing means 80 for changing the supply status of the fluid F (such as its flow speed, pressure, and flow direction) flowing to the ion exchange resin member 20 by controlling the rotation angle of the rotation shaft 74 of the direction changer 72 according to the operation status of the fuel cell 100 (for example, power generation quantity, the flow rate of gas to be supplied, the flow rate of gas to be discharged, the pressure of gas to be supplied, and the pressure of gas to be discharged) can be provided as the dispersion means.

Figure 29:
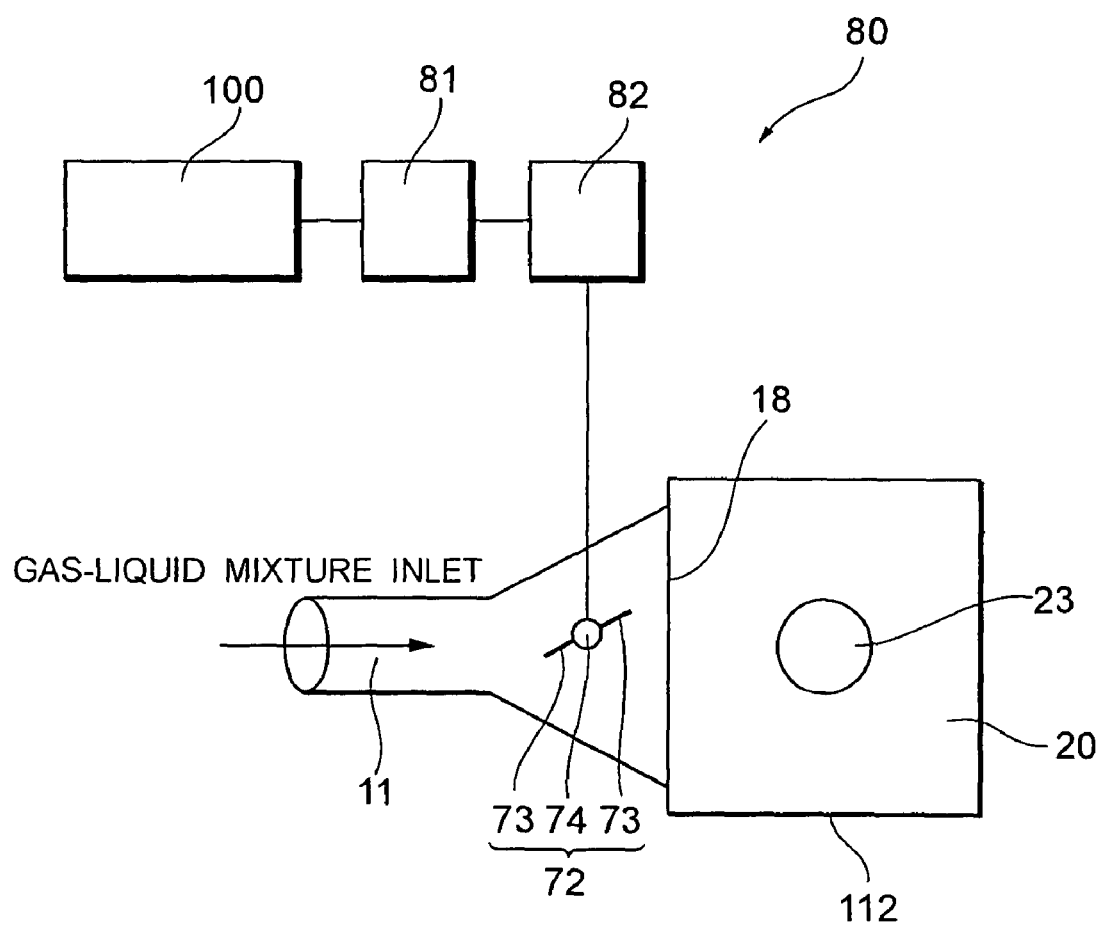
FIG. 29 is a schematic diagram of a dispersion means and its surrounding area according to another embodiment of the invention.

As shown in FIG. 29, this fluid-supply-status-changing means 80 includes: the direction changer 72 placed in the nozzle passage 71; a power-generation-quantity-measuring unit 81 for measuring the power generation quantity of the fuel cell 100; and a rotation-angle controller 82 that is connected to the rotation shaft 74 of the direction changer 72 and controls the rotation angle of the rotation shaft 74 according to information (data) input from the power-generation-quantity-measuring unit 81. Accordingly, the fluid-supply-status-changing means 80 can be used to disperse the liquid over, and make it flow to, the entire ion exchange resin member 20, and use the entire ion exchange resin member 20 efficiently.

Figure 30:
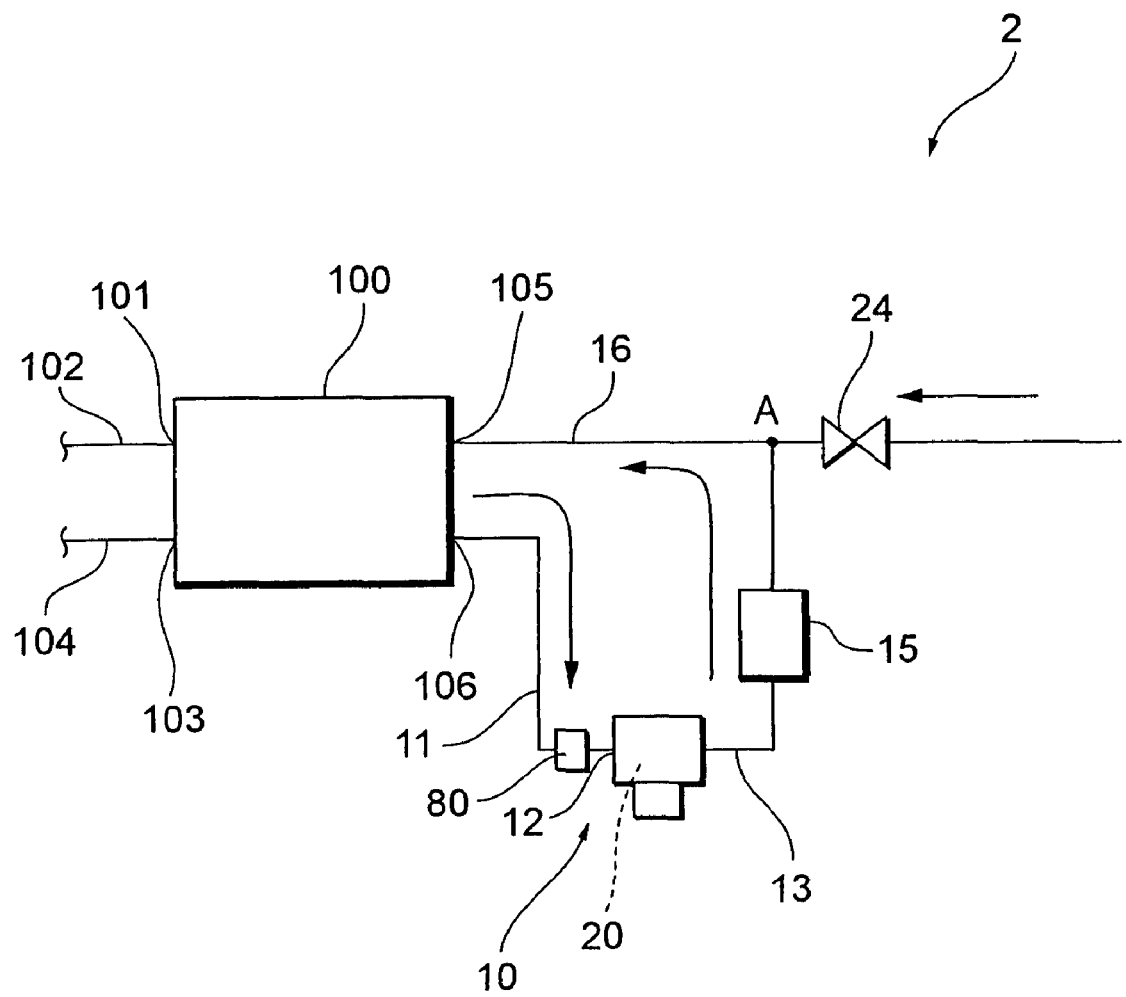
FIG. 30 is a schematic configuration diagram of a fuel cell system according to another embodiment of the invention.

Incidentally, the fluid-supply-status-changing means 80 can be placed upstream from the gas-liquid separator 12 in the circulation passage 11 in, for example, a fuel cell system 2 shown in FIG. 30. Besides the aforementioned configurations, the fluid F discharged from the fuel cell 100 may be received by a fluid chamber once; and when the fluid is then supplied from this chamber to the gas-liquid separator 12, the supply status of the fluid F (such as its flow speed, pressure, and flow direction) may be changed.

The fourth embodiment described the dispersion means being placed in the gas-liquid separator not of the type separating gas from liquid by utilizing a swirling flow. However, it should be understood that the dispersion means described in the fourth embodiment can be applied to a gas-liquid separator of the type separating gas from liquid by utilizing a swirling flow (the cyclone system).

(Fifth Embodiment)

Next, a fuel cell system according to a fifth embodiment of the invention will be described below with reference to the relevant drawings.

Figure 31:
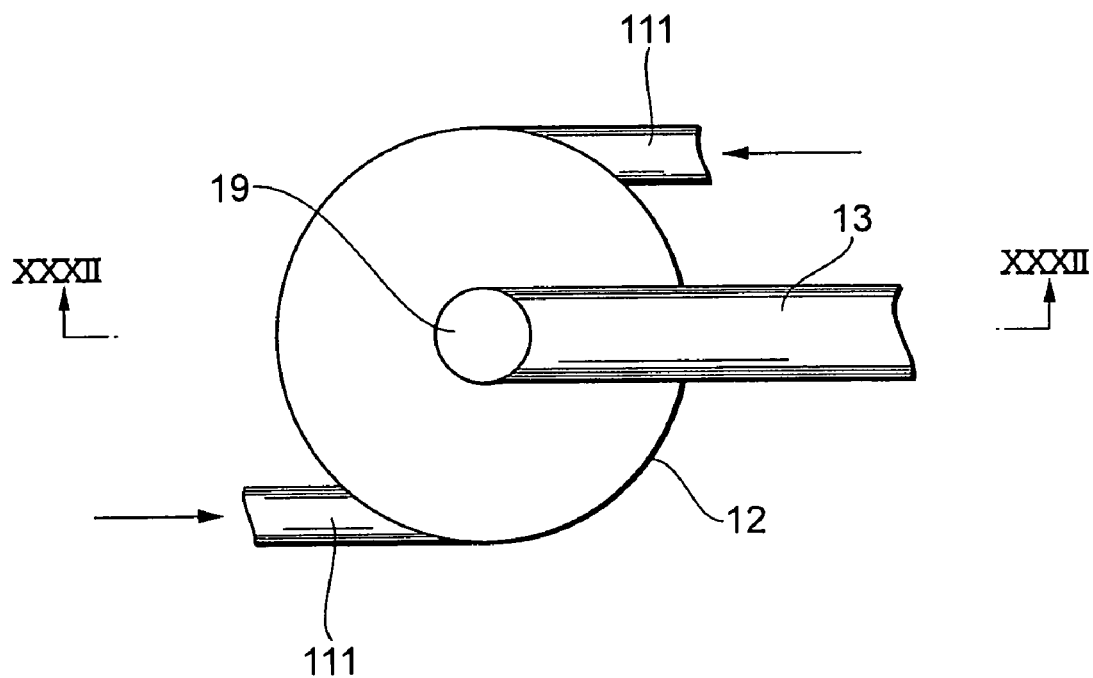
FIG. 31 is a plane view of a gas-liquid separator that is placed in a fuel cell system according to the fifth embodiment of the invention and contains an ion exchange resin member.
Figure 32:
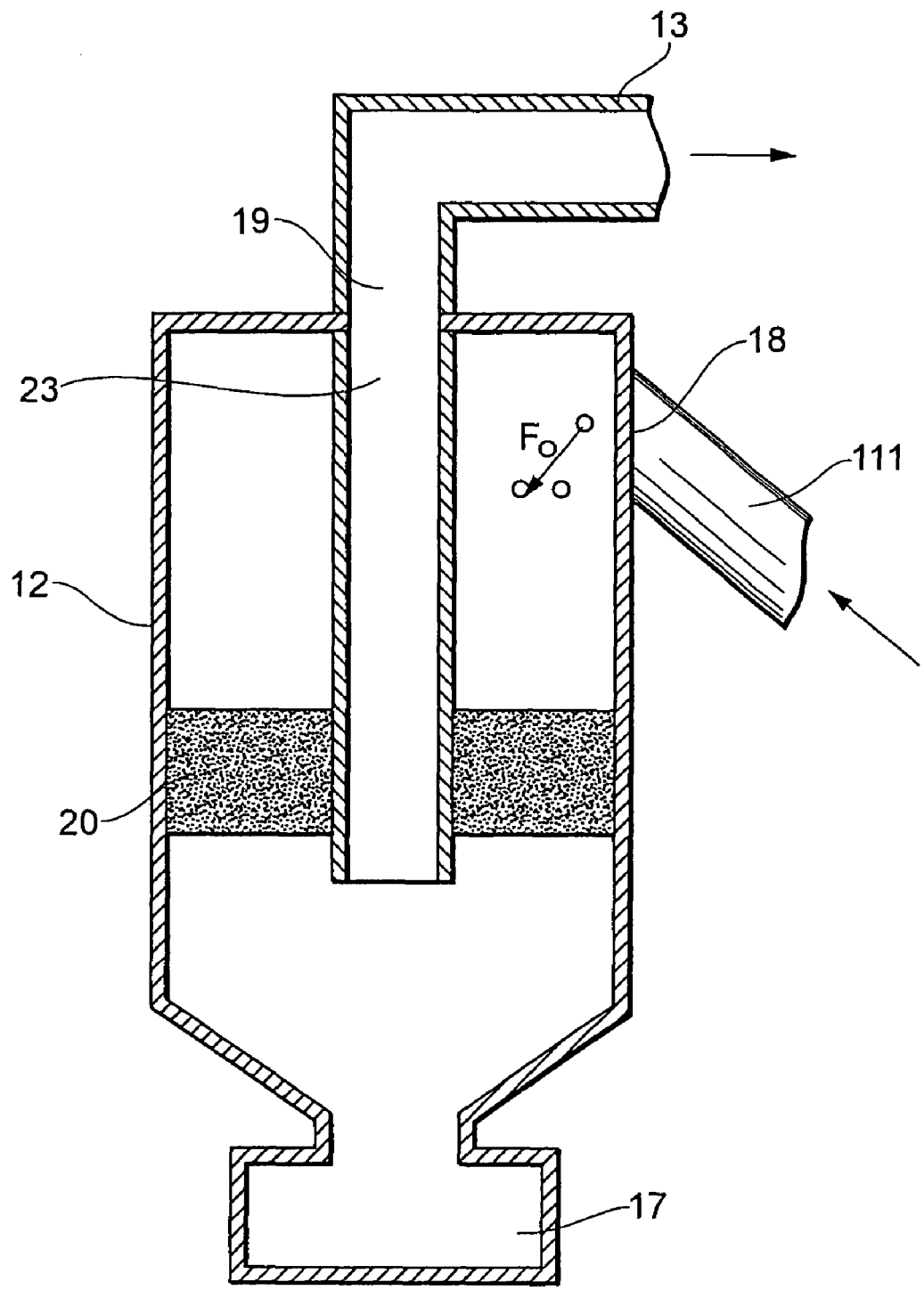
FIG. 32 is a cross-sectional view of the gas-liquid separator shown in FIG. 31 as taken along line XXXII-XXXII.

FIG. 31 is a plane view of a gas-liquid separator that is placed in a fuel cell system according to the fifth embodiment and contains an ion exchange resin member. FIG. 32 is a cross-sectional view of the gas-liquid separator shown in FIG. 31 as taken along line XXXII-XXXII.

The elements used in the fifth embodiment the same as those explained in the first embodiment are given the same reference numerals as in the first embodiment, and any detailed description of them has been omitted.

The difference between the fuel cell system 1 according to the fifth embodiment and the fuel cell system 1 according to the first embodiment is that the dispersion means is composed of two fluid passages 111 connected to the gas-liquid separator 12.

Specifically speaking, the fuel cell system 1 according to the fifth embodiment is configured so that two fluid passages 11 are connected to the upper part of the gas-liquid separator 12, instead of having the fluid passage 22 on the surface of the ion exchange resin member 20, like in the first embodiment. The end of the circulation passage 11 closer to the gas separator 12 in the fuel cell system 1 branches off into two parts (not shown in the drawings). The fluid passages 111 are connected these respective branched parts of the circulation passage 11 so that they supply the fluid F from the circulation passage 11 to the gas-liquid separator 12. These two fluid passages 111 are connected to the gas-liquid separator 12 at positions 180 degrees apart from each other (located at the opposite ends of the same diagonal line).

In the gas-liquid separator 12 having this configuration, the fluid F is supplied from the two fluid passages 111 respectively into the gas-liquid separator 12. Accordingly, since this fluid F in the dispersed state flows to the entry-side surface of the ion exchange resin member 20, it is possible to prevent disproportionate inflow of the fluid to a specified area of the entry-side surface of the ion exchange resin member 20. As a result, the entire ion exchange resin member 20 can be used efficiently.

The fifth embodiment described the two fluid passages 111 being connected to the gas-liquid separator 12. However, the configuration of the invention is not limited to this example, and three or more fluid passages 111 may be connected to the gas-liquid separator 12. The larger the number of fluid passages 111 provided, the more dispersed the fluid F becomes when flowing to the entry-side surface of the ion exchange resin member 20. Also, the positions of the fluid passages 111 can be arbitrarily set as necessary.

The fifth embodiment described the case where the fluid passages 111 are connected to the gas-liquid separator 12 of the type separating gas from liquid by utilizing the swirling flow. However, the configuration of the invention is not limited to this example, and the fluid passages 111 may be connected to the gas-liquid separator 112 (see FIG. 18) of the type separating gas from liquid by utilizing, for example, a pressure difference, but not the swirling flow.

Furthermore, the fifth embodiment described the fluid passages 111 being connected to the gas-liquid separator 12 in which the ion exchange resin member 20 is placed. However, the configuration of the invention is not limited to this example, and a plurality of discharge passages (fluid passages) may be connected to, for example, a case (housing) for housing the ion exchange resin, as long as the fluid F can be supplied from the plurality of discharge passages (fluid passages) to the ion exchange resin member 20.

Furthermore, in the fuel cell system according to the invention, the fluid passages 111 that are the dispersion means according to the fifth embodiment may be placed in combination with the dispersion means according to the first to fourth embodiments described above.

The first to fifth embodiments described the dispersion means being placed in the circulation passage of the hydrogen circulation system 10. However, the configuration of the invention is not limited to this example, and the dispersion means according to the invention may be placed in the oxidizing gas (air) supply system or other piping systems.

(Sixth Embodiment)

Next, a fuel cell system according to a sixth embodiment of the invention will be described below with reference to the relevant drawings.

Figure 33:
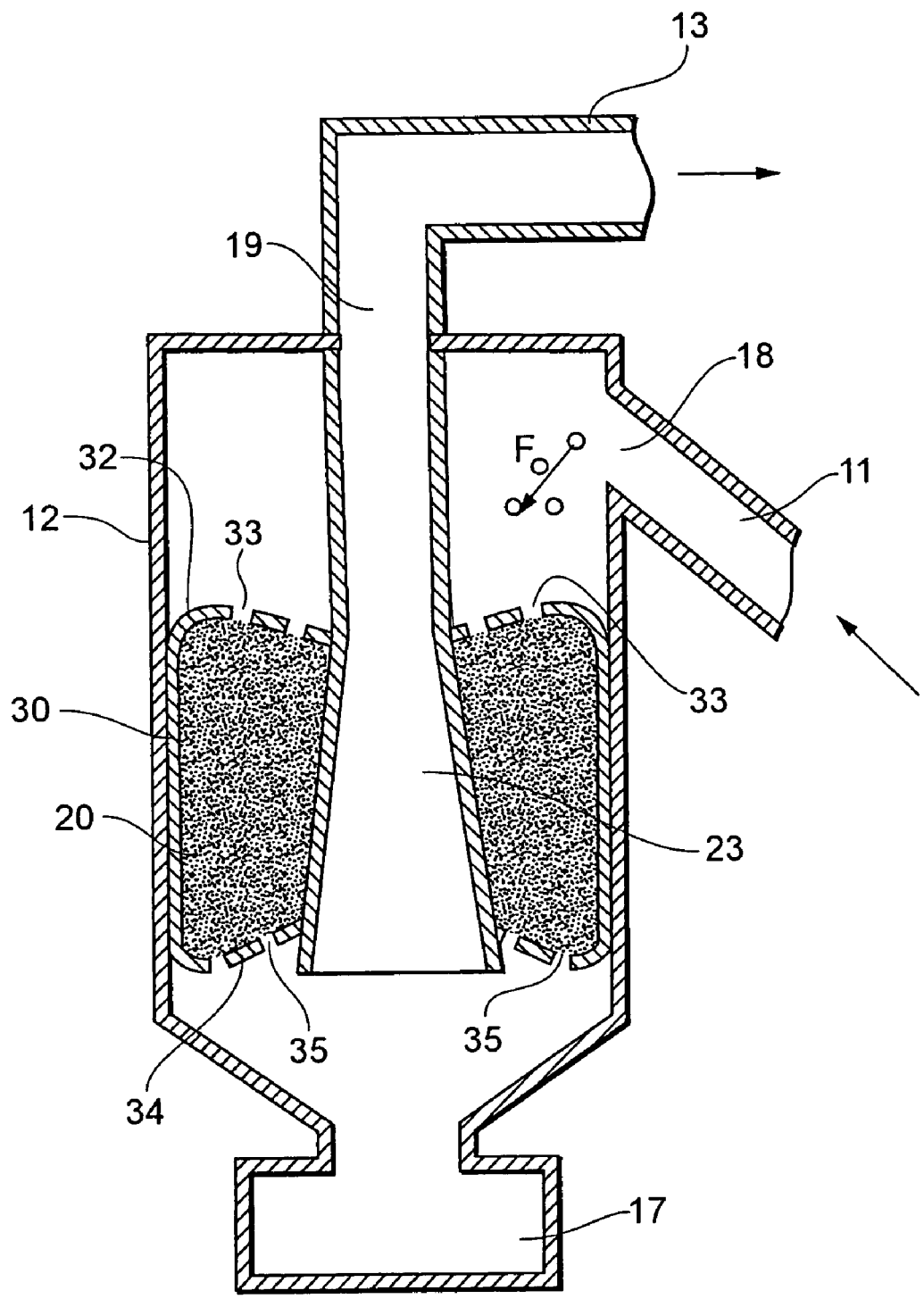
FIG. 33 is a cross-sectional view of a gas-liquid separator, an ion exchange resin member that is an impurity remover contained in the gas-liquid separator, and their surrounding area according to the sixth embodiment of the invention.

FIG. 33 is a cross-sectional view of a gas-liquid separator, an ion exchange resin member that is an impurity remover contained in the gas-liquid separator, and their surrounding area according to the sixth embodiment of the invention. The elements used in the sixth embodiment the same as those explained in the second embodiment are given the same reference numerals as in the second embodiment, and any detailed description of them has been omitted.

The difference between the fuel cell system according to the sixth embodiment and the fuel cell system according to the second embodiment is the shape of the gas passage 23. Specifically speaking, the gas passage 23 according to the sixth embodiment has a generally conical shape whose diameter increases toward its fluid inlet (the underside in FIG. 33) and whose fluid inlet end extends lower than the case 30.

Since the gas passage 23 having the above-described configuration has a large aperture size for the fluid inlet, the speed of the gas passing through the gas passage 23 can be reduced. As a result, it is possible to decrease the kinetic energy of the gas and prevent the liquid from being caught by the gas cyclone and taken into the gas passage 23.

In the sixth embodiment, the inclined plane is formed at the fluid outlet of the ion exchange resin member 20 and a plurality of through-holes 35 is formed. However, the configuration of the invention is not limited to this example, and it is possible to prevent the liquid from being caught by the gas cyclone and taken into the gas passage 23 merely by forming the gas passage 23 in the generally conical shape as described above.

Also, the sixth embodiment described the inlet end of the gas passage 23 extending lower than the case 30. However, the configuration of the invention is not limited to this example, and the inlet end of the gas passage 23 may be formed in the same plane as the outlet side of the case 30, without extending out of the case 30. In this case, the deflecting guide 37 that bends away from the gas passage 23 may be provided at the boundary of the gas passage 23 and the outlet-side surface 34 of the case 30.

Figure 34:
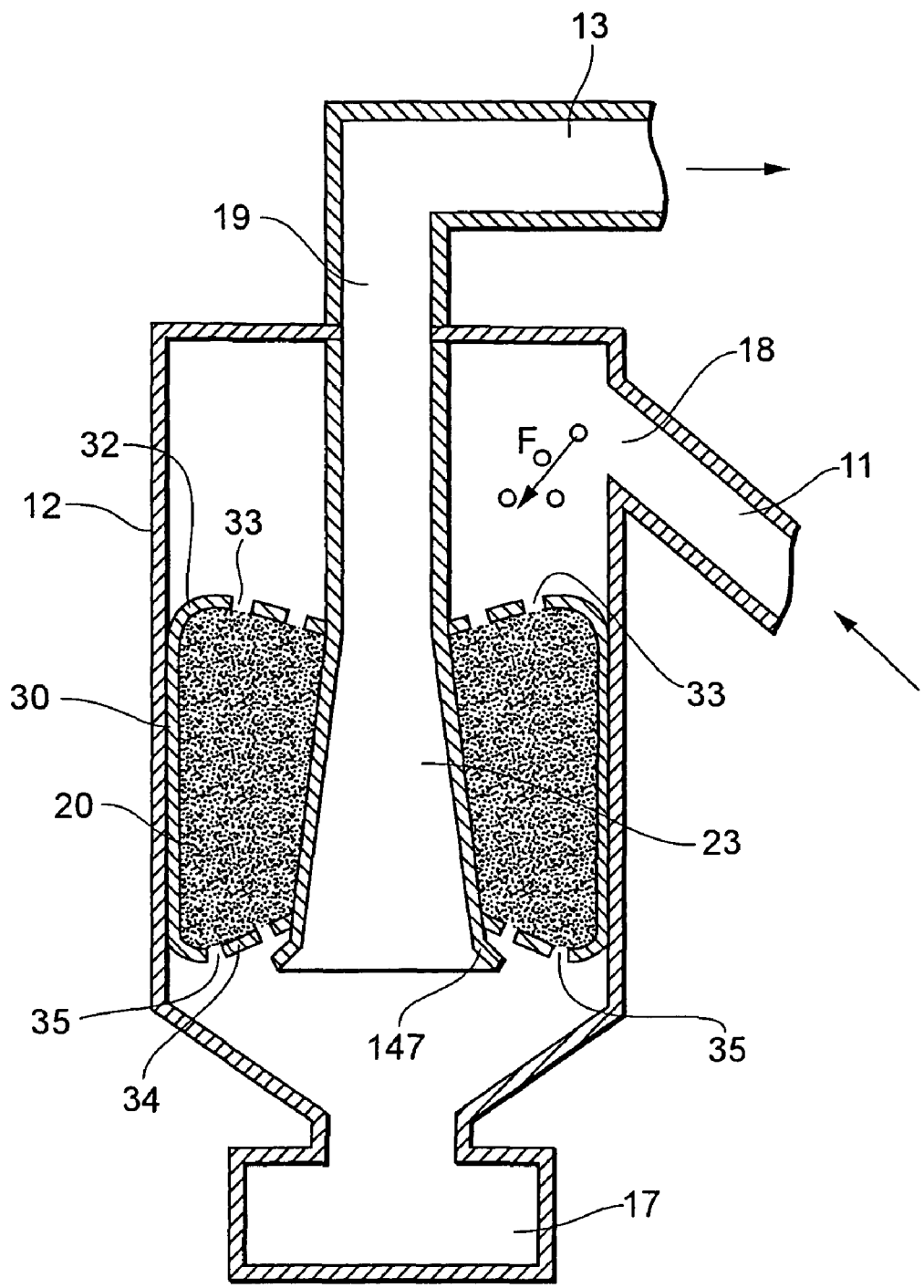
FIG. 34 is a cross-sectional view of a gas-liquid separator, an ion exchange resin member that is an impurity remover contained in the gas-liquid separator, and their surrounding area according to another embodiment of the invention.

Furthermore, a deflecting guide 147 that extends lower than the case 30 and bends away from the gas passage 23 may be provided at the generally conical inlet end of the gas passage as shown in FIG. 34.

(Seventh Embodiment)

Next, a fuel cell system according to a seventh embodiment of the invention will be described below with reference to the relevant drawings.

Figure 35:
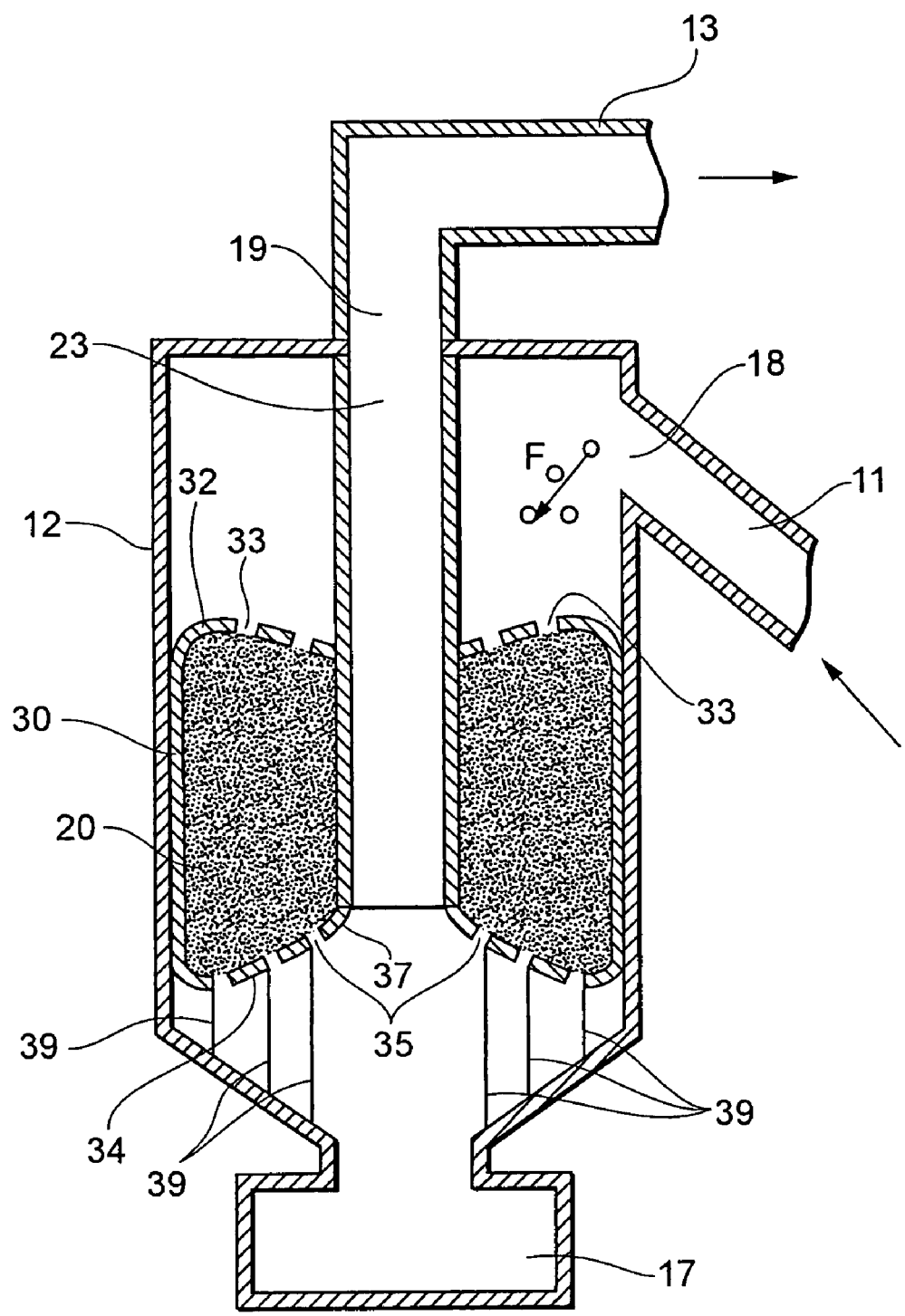
FIG. 35 is a cross-sectional view of a gas-liquid separator, an ion exchange resin member that is an impurity remover contained in the gas-liquid separator, and their surrounding area according to the seventh embodiment of the invention.
Figure 36:
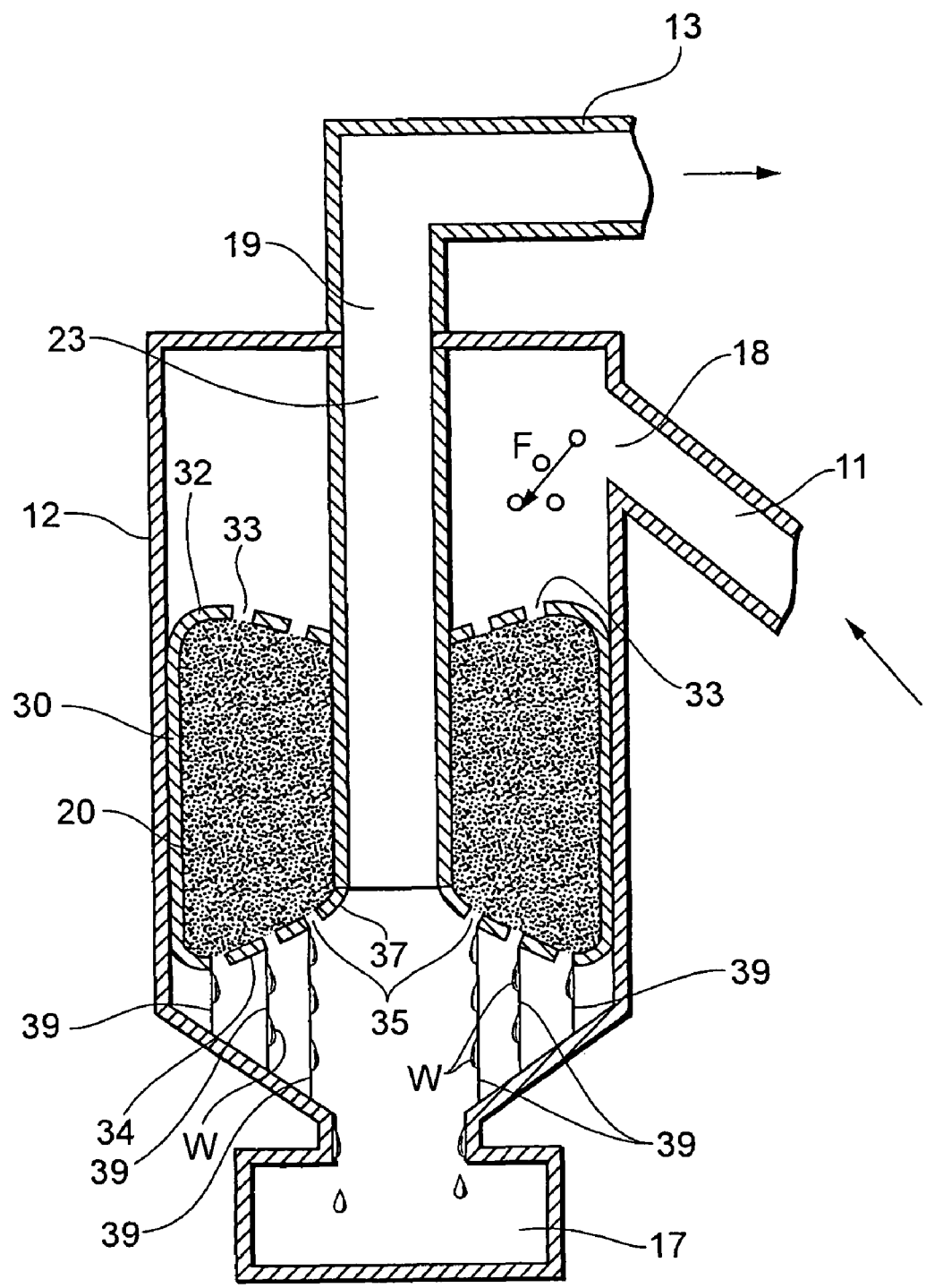
FIG. 36 schematically shows the state where liquid droplets run down guide members placed next to the ion exchange resin member shown in FIG. 35 and fall down to a water discharge port.

FIG. 35 is a cross-sectional view of a gas-liquid separator, an ion exchange resin member that is an impurity remover contained in the gas-liquid separator, and their surrounding area according to the seventh embodiment of the invention. FIG. 36 schematically shows the state where liquid droplets run down guide members placed next to the ion exchange resin member shown in FIG. 35 and fall down to a water discharge port. The elements used in the seventh embodiment the same as those explained in the second embodiment are given the same reference numerals as in the second embodiment, and any detailed description of them has been omitted.

The difference between the fuel cell system according to the seventh embodiment and the fuel cell system according to the second embodiment is that guide members 39 that serve as liquid guide means for guiding the liquid in the fluid discharged from the through-holes 35 to the water discharge port 17 are provided where the through-holes 35 formed in the outlet-side surface 34 (fluid outlet) of the ion exchange resin member 20.

The guide members 39 are narrow cylindrical-bar-shaped members that extend generally in parallel with the direction of gravitational force, and their ends are secured to the inside wall of the lower part of the gas-liquid separator 12. These guide members 39 may be allocated to all the through-holes 35 or some of the through-holes 35 arbitrarily. As shown in FIG. 36, the liquid in the fluid discharged from the through-holes 35 dribbles down the guide members 39 and becomes droplets W, whose masses then increase as they fall down to the water discharge port 17.

The above-described configuration can reliably prevent the liquid from being caught in the gas cyclone and moving together with the gas toward the gas passage 23.

Figure 37:
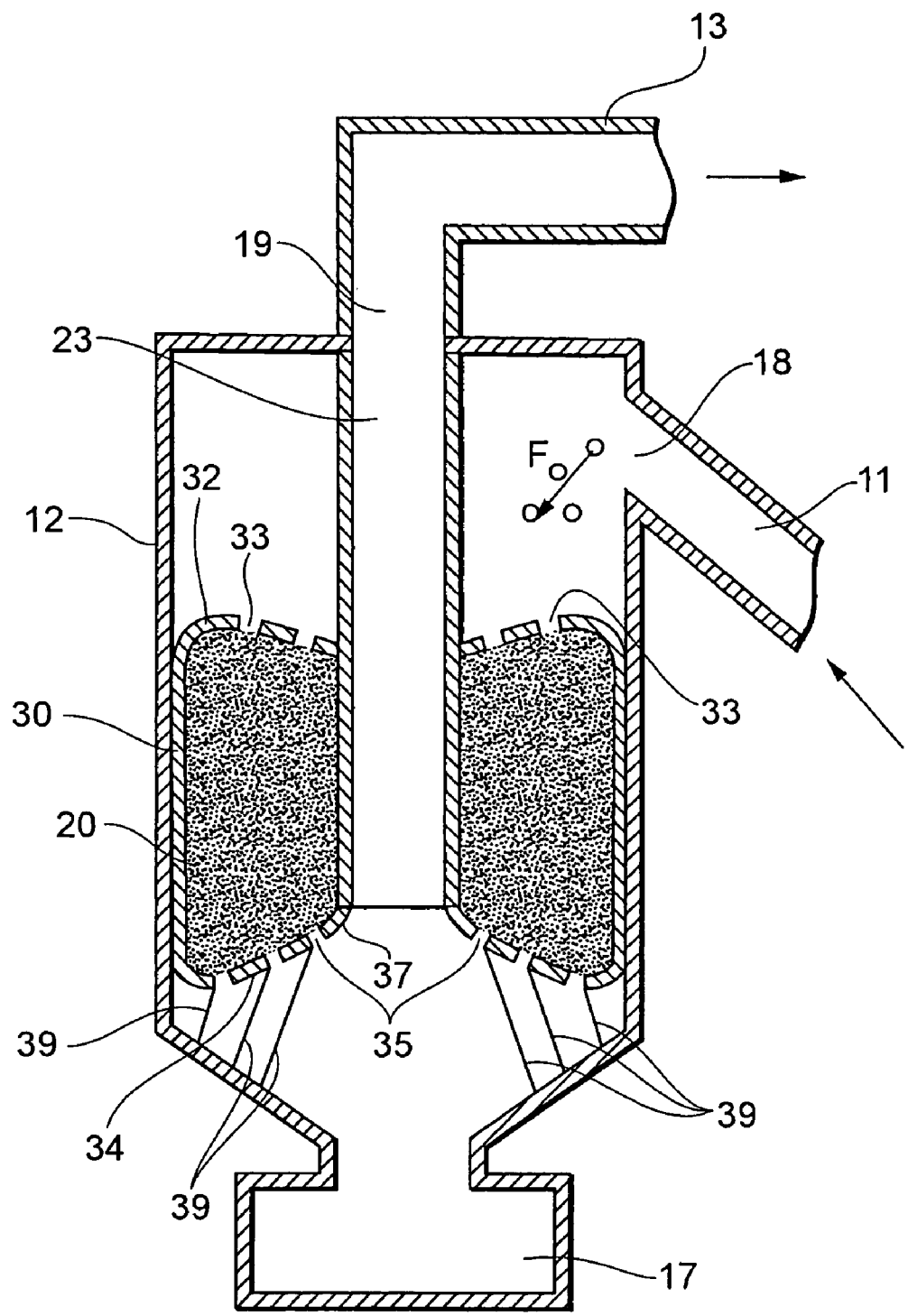
FIG. 37 is a cross-sectional view of a gas-liquid separator, an ion exchange resin member that is an impurity remover contained in the gas-liquid separator, and their surrounding area according to another embodiment of the invention.
Figure 38:
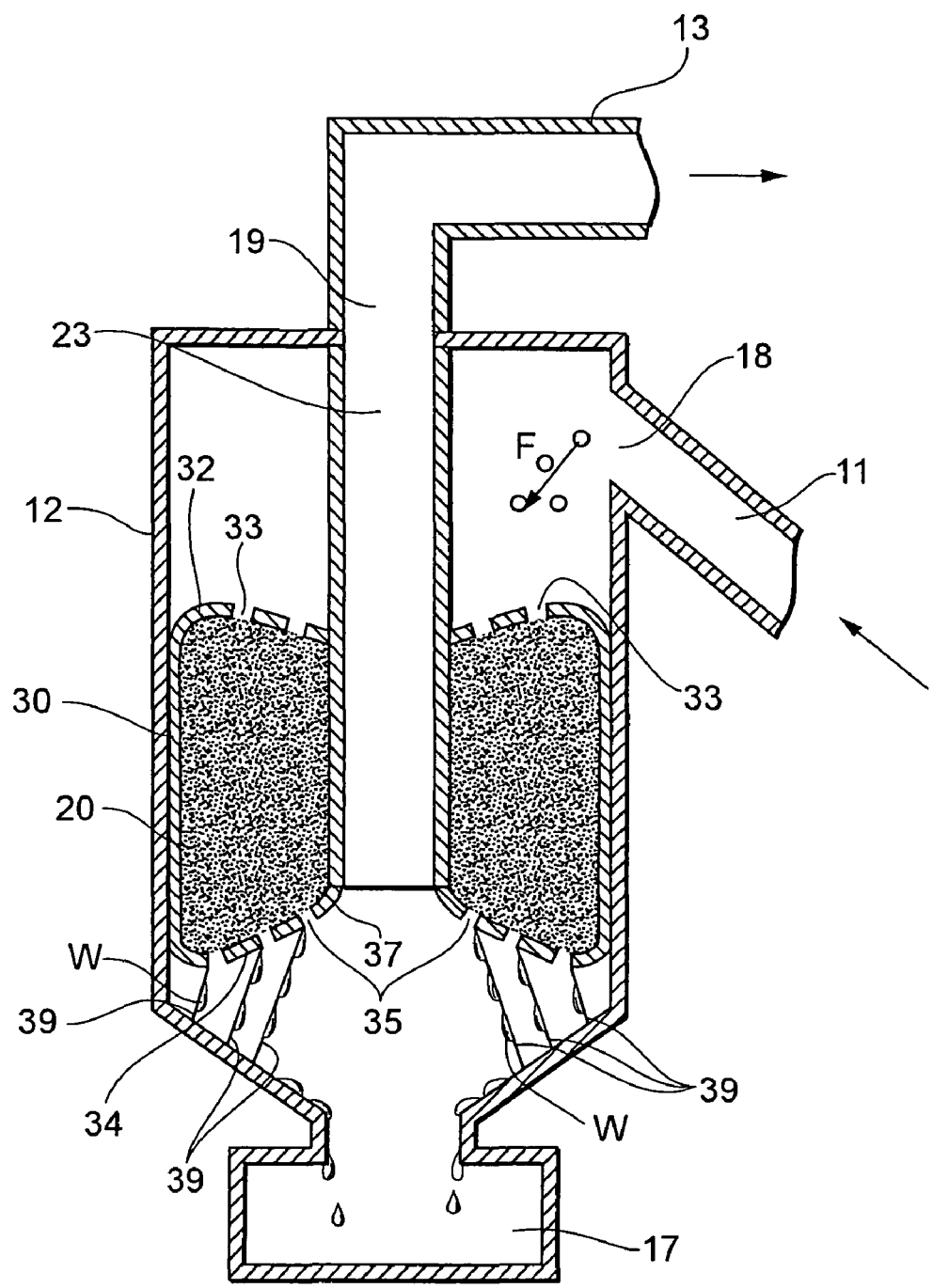
FIG. 38 schematically shows the state where liquid droplets run down guide members placed next to the ion exchange resin member shown in FIG. 37 and fall down to a water discharge port.

As shown in FIGS. 37 and 38, the guide members 39 may extend in a direction away from the gas passage 23 and their ends may be secured to the inside wall of the lower part of the gas-liquid separator 12. Consequently, the liquid droplets W (see FIG. 38) can be kept away from the gas passage 23. As a result, it is possible to more reliably prevent the liquid from being caught by the gas cyclone and moving together with the gas toward the gas passage 23.

The seventh embodiment described the ends of the guide members 39 being secured to the inside wall of the lower part of the gas-liquid separator 12. However, the ends of the guide members 39 may not necessarily be secured to the inside wall of the lower part of the gas-liquid separator 12.

Moreover, the seventh embodiment described the case where the guide members 39 provided are narrow cylindrical-bar-shaped members. However, the shape of the guide members 39 is not limited to this example, and the guide members 39 may be of other shapes such as polygonal columns, chains, or nets, as long as they can guide the liquid toward the water discharge port 17.

Furthermore, the seventh embodiment described the inclined plane being formed at the fluid outlet of the ion exchange resin member 20 and the plurality of through-holes 35 being formed. However, the configuration of the invention is not limited to this example, and it is possible to prevent the liquid from being caught by the gas cyclone and taken into the gas passage 23 merely by providing the guide members 39 at the fluid outlet of the ion exchange resin member 20.

(Eighth Embodiment)

A fuel cell system according to an eighth embodiment of the invention will be described below with reference to the relevant drawings.

Figure 39:
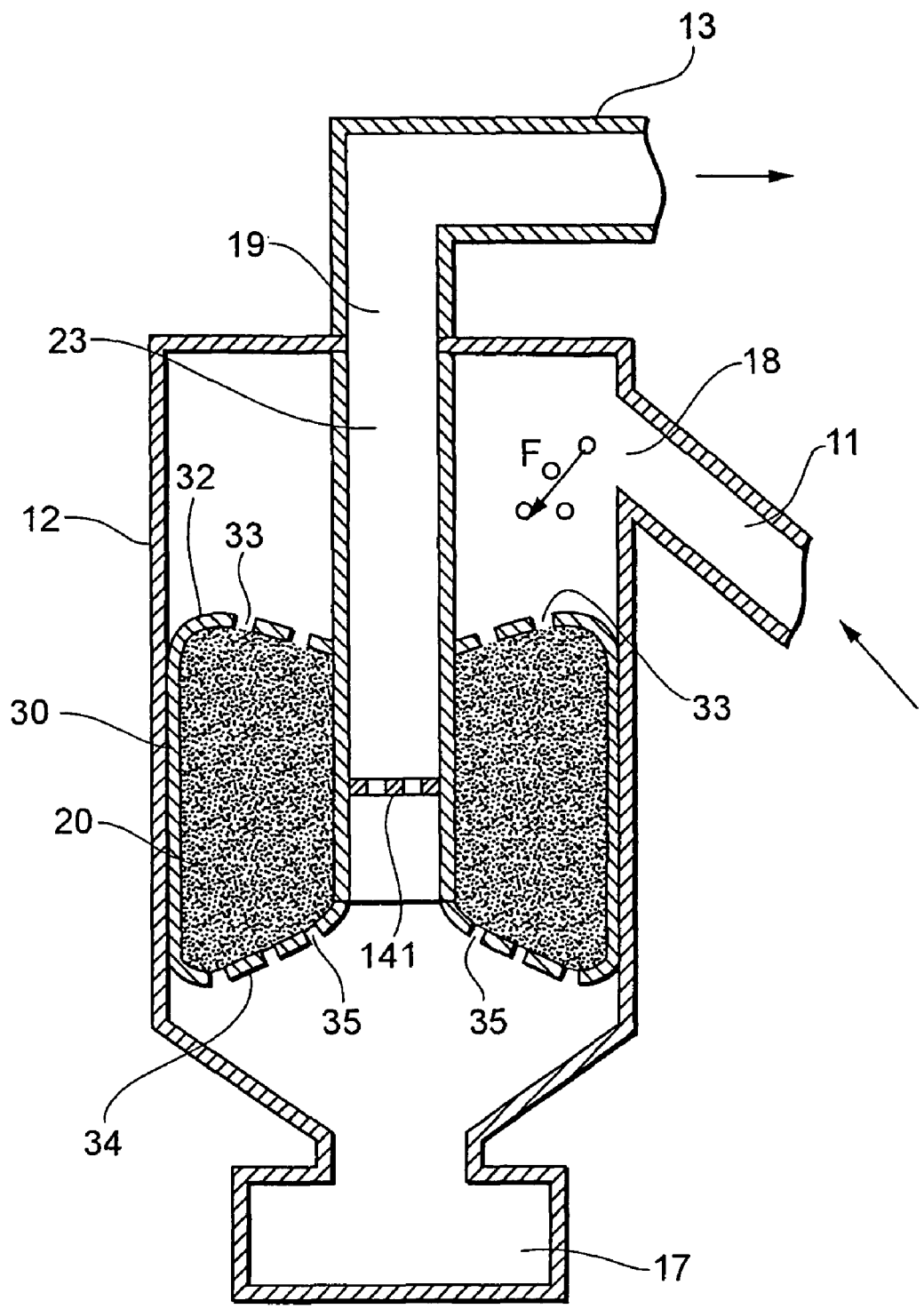
FIG. 39 is a cross-sectional view of a gas-liquid separator, an ion exchange resin member that is an impurity remover contained in the gas-liquid separator, and their surrounding area according to the eighth embodiment of the invention.
Figure 40:
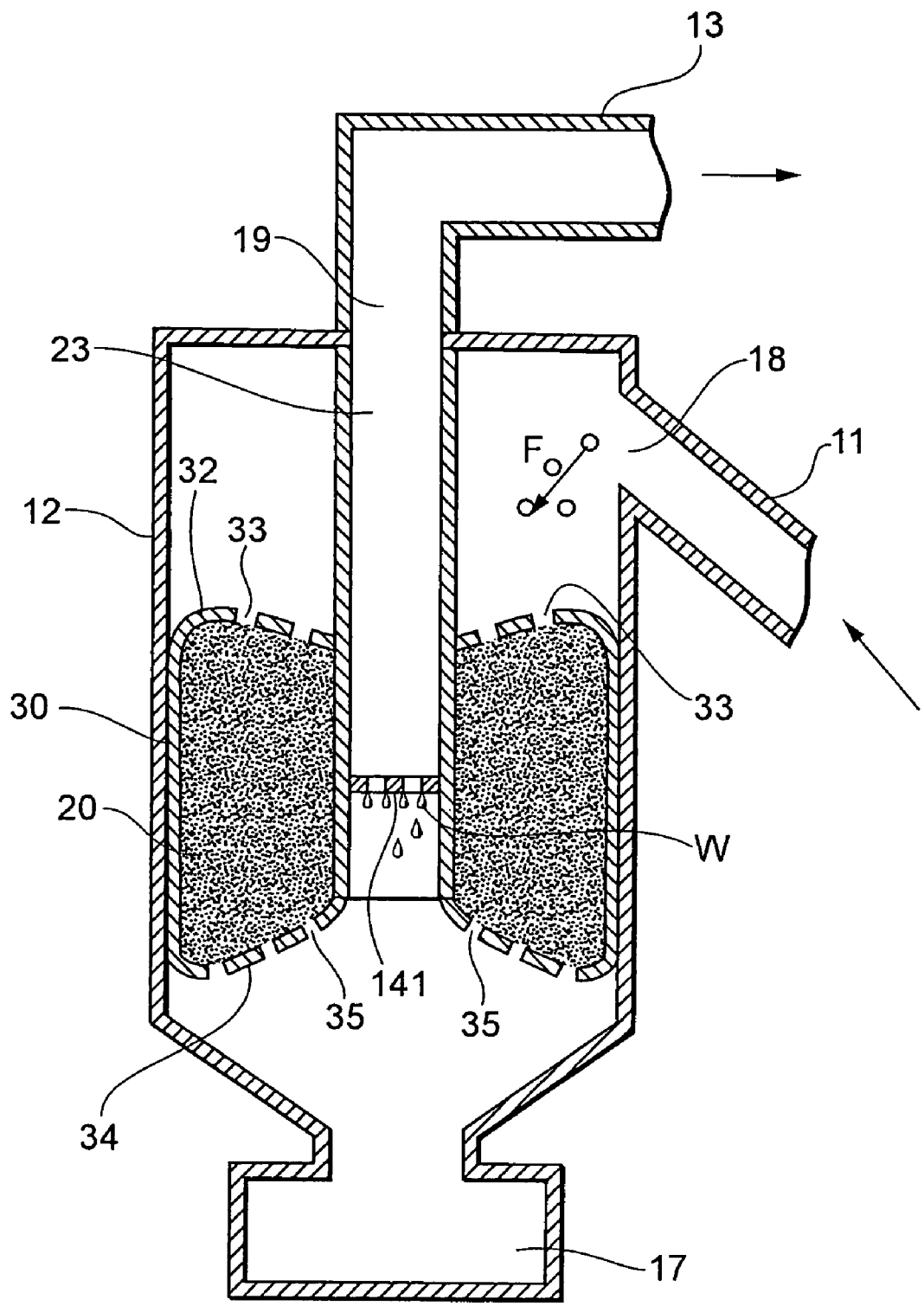
FIG. 40 schematically shows the state where liquid droplets collected in a liquid collecting member placed in the ion exchange resin member shown in FIG. 39 fall down to a discharge port.

FIG. 39 is a cross-sectional view of a gas-liquid separator, an ion exchange resin member that is an impurity remover contained in the gas-liquid separator, and their surrounding area according to the eighth embodiment of the invention. FIG. 40 schematically shows the state where liquid droplets collected in a liquid collecting member placed in the ion exchange resin member shown in FIG. 39 fall down to a water discharge port. The elements used in the eighth embodiment the same as those explained in the second embodiment are given the same reference numerals as in the second embodiment, and any detailed description of them has been omitted.

As shown in FIGS. 39 and 40, the difference between the fuel cell system according to the eighth embodiment and the fuel cell system according to the second embodiment is a liquid collecting member 141 for collecting the liquid placed inside the gas passage 23 of the ion exchange resin member 20.

The liquid collecting member 141 is a generally disk-shaped member with a fine screen, is secured to the inside wall of the gas passage 23, and has a function making the gas pass through and collecting the liquid. Accordingly, if this liquid collecting member 141 is provided, even if part of the liquid, together with the gas, enters the gas passage 23, this liquid can be collected to form liquid droplets and the liquid droplets can be discharged to the water discharge port 17.

There is no particular limitation on the shape of the liquid collecting member 141 as long as it makes the gas pass through and collects the liquid.

The eighth embodiment described the inclined plane being formed at the fluid outlet of the ion exchange resin member 20 and the plurality of through-holes 35 being formed. However, the configuration of the invention is not limited to this example, and it is possible to prevent the liquid from entering the gas passage 23 merely by providing the liquid collecting member 141 in the gas passage 23.

The first to eighth embodiments described the ion exchange resin member 20 being placed in the circulation passage of the hydrogen circulation system 10. However, the configuration of the invention is not limited to this example, and the ion exchange resin member 20 according to the invention may be placed in the oxidizing gas (air) supply system or other piping systems.

The first to eighth embodiments described the ion exchange resin member 20 being provided as the impurity remover. However, the configuration of the invention is not limited to this example, and the impurity remover may not necessarily be configured to include the ion exchange resin as its main component, as long as the impurity remover can remove impurities from the fluid.

Figure 41:
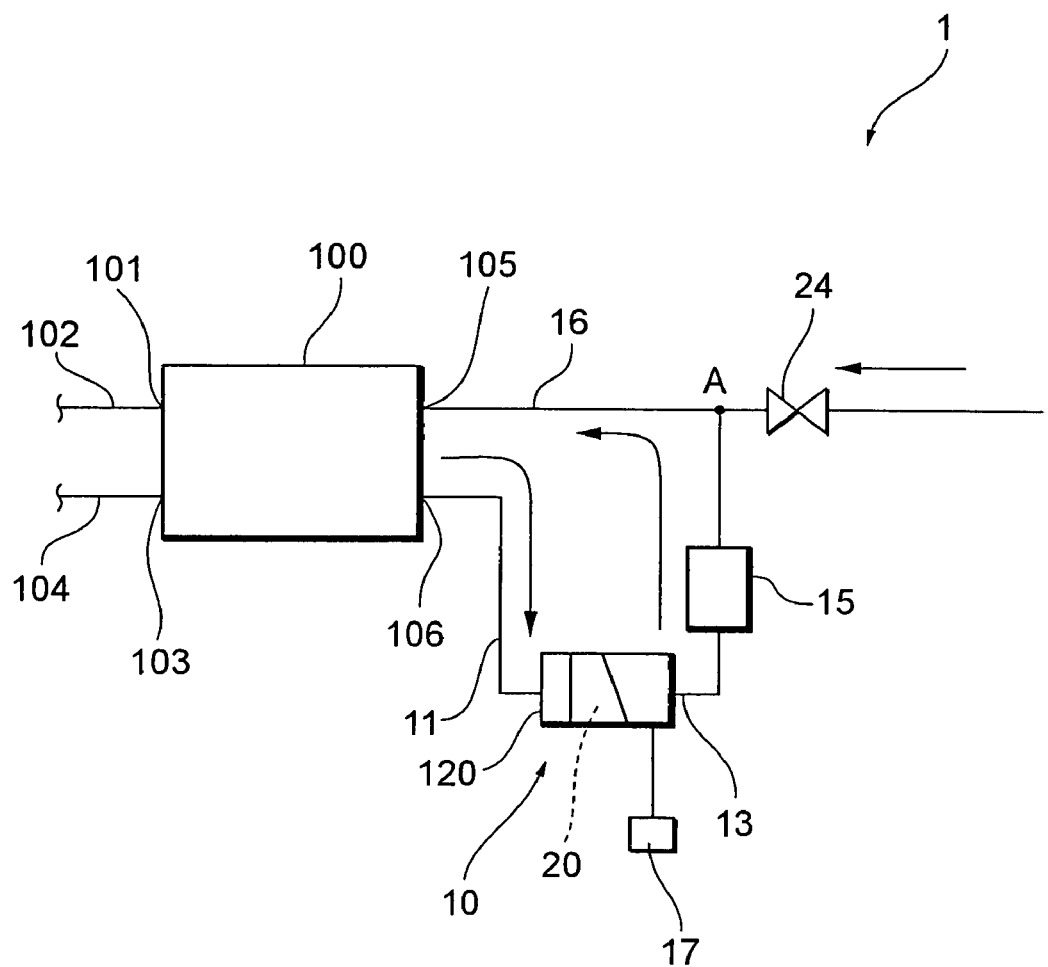
FIG. 41 is a schematic configuration diagram of a fuel cell system according to another embodiment of the invention.

Furthermore, the first to eighth embodiments described a cyclone type gas-liquid separator 12 being used. However, the configuration of the invention is not limited to this example, and it should be understood that the ion exchange resin member 20 can be also employed if another type of gas-liquid separator is used. In this case, the ion exchange resin member 20 whose fluid-flow-direction-length gradually increases from its upper part to its lower part may be placed in a gas-liquid separator 120 as shown in FIG. 41. Specifically speaking, the ion exchange-resin member 20 is designed so that the time required for the fluid to pass through the upper part of the ion exchange resin member 20, in which a comparatively small amount of impurities is contained and through which gas which has a small mass mainly passes, is short; and the time required for the fluid to pass through the lower part of the ion exchange resin member 20, in which a comparatively large amount of impurities are contained and through which liquid which has a large mass mainly passes, is long. As a result, impurities can be removed efficiently.

INDUSTRIAL APPLICABILITY

In the fuel cell system according to the invention, the dispersion means for dispersing the fluid over, and making it flow to, the entry-side surface of the impurity remover is placed upstream from the impurity remover. Accordingly, it is possible to prevent disproportionate inflow of the generated water to a specified area of the entry-side (inlet) surface of the impurity remover and use the entire impurity remover efficiently.

Moreover, the fuel cell system according to the invention is equipped with the liquid-movement-preventing means for preventing the liquid in the fluid discharged from the fluid outlet of the impurity remover from moving toward the gas discharge part. Accordingly, when the fluid has passed through the impurity remover and then the liquid moves toward the liquid discharge part and the gas moves toward the gas discharge part, the liquid can be prevented from being caught by the gas and taken into the gas discharge part. As a result, the fuel cell system can achieve good gas-liquid separability.

What is claimed is:

1. A fuel cell system equipped with an ion exchange resin member that removes impurities from a fluid discharged from a fuel cell, the ion exchange resin member being located inside a gas-liquid separator for separating gas and liquid by swirling the fluid in a discharge passage for the fluid to flow through, the fuel cell system comprising:
   a dispersion means for dispersing the fluid over, and making the fluid flow to, an entry-side surface of the ion exchange resin member, and being configured to distribute the fluid flow so that the fluid flows into the entire ion exchange resin member, the dispersion means is a fluid introducing member in which a plurality of through holes is formed, wherein:
   the fluid introducing member is configured as a case to accommodate the ion exchange resin member,
   the dispersion means includes a fluid passage formed around the outer periphery of the entry-side surface of the ion exchange resin member, and
   the fluid introducing member includes an inclined plane that is inclined downward from its outer periphery toward its central part, the plurality of through-holes being formed on the inclined plane.

2. The fuel cell system according to claim 1, wherein the fluid passage is composed of a groove member formed in the entry-side surface of the ion exchange resin member.

3. The fuel cell system according to claim 1, wherein the through-holes radiate out from the central part of the fluid introducing member toward an outer periphery of the fluid introducing member.

4. The fuel cell system according to claim 1, wherein the through-holes are placed in a staggered manner from the central part of the fluid introducing member toward its outer part.

5. The fuel cell system according to claim 1, wherein the through-holes have different aperture sizes depending on a distance of the through-holes from the central part of the fluid introducing member.

6. The fuel cell system according to claim 5, wherein the aperture size of each through-hole increases the closer each through-hole is located to the outer periphery of the fluid introducing member.

7. A fuel cell system equipped with an ion exchange resin member that removes impurities from a fluid discharged from a fuel cell, the ion exchange resin member being located inside a gas-liquid separator for separating gas and liquid by swirling the fluid in a discharge passage for the fluid to flow through, the fuel cell system comprising:
   a dispersion means for dispersing the fluid over, and making the fluid flow to, an entry-side surface of the ion exchange resin member, and being configured to distribute the fluid flow so that the fluid flows into the entire ion exchange resin member, the dispersion means is a fluid introducing member in which a plurality of through holes is formed, wherein:
   the fluid introducing member is configured as a case to accommodate the ion exchange resin member, and
   a gas discharge part and a liquid discharge part are provided downstream from a fluid outlet of the ion exchange resin member, and a liquid-movement-preventing means for preventing a liquid in the fluid discharged from the fluid outlet from moving toward the gas discharge part is placed between the ion exchange resin member and at least either the gas discharge part or the liquid discharge part.

8. A fuel cell system equipped with an ion exchange resin member that removes impurities from a fluid discharged from a fuel cell, the ion exchange resin member being located inside a gas-liquid separator for separating gas and liquid by swirling the fluid in a discharge passage for the fluid to flow through, the fuel cell system comprising:
   a dispersion means for dispersing the fluid over, and making the fluid flow to, an entry-side surface of the ion exchange resin member, and being configured to distribute the fluid flow so that the fluid flows into the entire ion exchange resin member, the dispersion means is a fluid introducing member in which a plurality of through holes is formed, wherein:
   the fluid introducing member is configured as a case to accommodate the ion exchange resin member, and
   the fluid introducing member includes an inclined plane that is inclined downward from its outer periphery toward its central part, the plurality of through-holes being formed on the inclined plane.

* * * * *